(12) United States Patent
Rogers et al.

(10) Patent No.: US 11,513,024 B2
(45) Date of Patent: Nov. 29, 2022

(54) DETERMINING OPERATIONAL HEALTH OF A PUMP

(71) Applicant: Schlumberger Technology Corporation, Sugar Land, TX (US)

(72) Inventors: Brian Rogers, Houston, TX (US); Vishwanathan Parmeshwar, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 860 days.

(21) Appl. No.: 16/420,604

(22) Filed: May 23, 2019

(65) Prior Publication Data

US 2020/0370988 A1 Nov. 26, 2020

(51) Int. Cl.
  *F04B 51/00* (2006.01)
  *G01M 3/26* (2006.01)
  (Continued)

(52) U.S. Cl.
  CPC .............. *G01M 3/26* (2013.01); *E21B 21/08* (2013.01); *F04B 15/02* (2013.01); *F04B 51/00* (2013.01);
  (Continued)

(58) Field of Classification Search
  CPC .......... F04B 51/00; F04B 1/00; F04B 7/0266; F04B 41/06; F04B 23/06; F04B 2201/0605; F04B 2205/02–05; E21B 47/10; E21B 47/117; E21B 43/26; E21B 43/2607; G01M 3/184; G01M 3/2876; G01M 3/003
  See application file for complete search history.

(56) References Cited

U.S. PATENT DOCUMENTS 4,705,459 A * 11/1987 Buisine .................. F04B 51/00
 417/63
5,112,196 A * 5/1992 Schuh ................. G01M 3/2876
 417/63
(Continued)

FOREIGN PATENT DOCUMENTS

CN 108757425 A 11/2018
WO 2016026680 A1 2/2016

OTHER PUBLICATIONS

International Search Report and Written Opinion issued in International Patent Application No. PCT/US2020/034501 dated Sep. 7, 2020, 13 pages.

*Primary Examiner* — Thomas Fink

(57) ABSTRACT

Apparatus and methods for determining operational health of a pump. An example method may include commencing operation of a processing device to monitor operational health of a pump for pumping a fluid at a wellsite, wherein the pump may be a reciprocating pump. During pumping operations of the pump, the processing device may receive pressure measurements of the fluid at a fluid inlet manifold and/or a fluid outlet manifold of the pump, receive position measurements of fluid displacing members of the pump, detect irregular pressure measurements based on the received pressure measurements, determine operational phase of the pump based on the received position measurements, and determine which of fluid inlet and outlet valves of the pump is leaking based on operational phase during which the irregular pressure measurements are detected.

17 Claims, 9 Drawing Sheets

(51) Int. Cl.
*E21B 21/08* (2006.01)
*F04B 15/02* (2006.01)
*F04B 53/10* (2006.01)
*G01M 3/18* (2006.01)

(52) U.S. Cl.
CPC ............ *F04B 53/10* (2013.01); *G01M 3/184* (2013.01); *F04B 2201/0201* (2013.01); *F04B 2201/0605* (2013.01); *F04B 2205/02* (2013.01); *F04B 2205/04* (2013.01)

(56) References Cited

U.S. PATENT DOCUMENTS

| | | | |
|---|---|---|---|
| 5,439,355 A * | 8/1995 | Jimison | A61M 5/16854 417/63 |
| 7,925,472 B2 | 4/2011 | Nasr et al. | |
| 8,347,957 B2 | 1/2013 | Stephenson et al. | |
| 8,423,397 B2 | 4/2013 | Sitton | |
| 8,676,721 B2 | 3/2014 | Piovesan et al. | |
| 9,934,479 B2 | 4/2018 | Sanchez et al. | |
| 2004/0167738 A1* | 8/2004 | Miller | F04B 51/00 702/114 |
| 2004/0226346 A1* | 11/2004 | Schluecker | F04B 51/00 73/46 |
| 2007/0154325 A1* | 7/2007 | Grant | F04B 51/00 417/63 |
| 2009/0192731 A1 | 7/2009 | De Jesus et al. | |
| 2010/0189580 A1 | 7/2010 | Kyllingstad | |
| 2012/0126795 A1* | 5/2012 | Genoud | G01F 11/021 324/207.2 |
| 2013/0071260 A1* | 3/2013 | Worden | F04B 49/065 417/63 |
| 2013/0233165 A1 | 9/2013 | Matzner et al. | |
| 2013/0280106 A1* | 10/2013 | Kyllingstad | F04B 51/00 417/63 |
| 2015/0022326 A1 | 1/2015 | Baxter et al. | |
| 2016/0168979 A1 | 6/2016 | Zhang et al. | |
| 2016/0274551 A1 | 9/2016 | Mishra et al. | |
| 2016/0292652 A1 | 10/2016 | Bowden, Jr. et al. | |
| 2016/0371957 A1 | 12/2016 | Ghaffari et al. | |
| 2017/0211569 A1 | 7/2017 | Urdaneta et al. | |
| 2017/0268323 A1 | 9/2017 | Dykstra et al. | |
| 2018/0003122 A1* | 1/2018 | Burkell | F04B 51/00 |
| 2018/0293551 A1 | 10/2018 | Buca | |
| 2019/0055937 A1* | 2/2019 | Parmeshwar | F04B 9/045 |
| 2020/0370988 A1* | 11/2020 | Rogers | G01M 3/2876 |
| 2021/0388831 A1* | 12/2021 | Camacho Cardenas | F04B 51/00 |

* cited by examiner

DETERMINING OPERATIONAL HEALTH OF A PUMP

BACKGROUND OF THE DISCLOSURE

Wells are generally drilled into the ground or ocean bed to recover natural deposits of oil, gas, and other materials that are trapped in subterranean formations. Well construction operations (e.g., drilling operations) may be performed at a wellsite by a drilling system (i.e., a drill rig) having various automated surface and subterranean equipment operating in a coordinated manner. For example, a drive mechanism, such as a top drive or rotary table located at a wellsite surface, may be utilized to rotate and advance a drill string into a subterranean formation to drill a wellbore. The drill string may include a plurality of drill pipes coupled together and terminating with a drill bit. Length of the drill string may be increased by adding additional drill pipes while depth of the wellbore increases. Drilling fluid (i.e., mud) may be pumped by mud pumps from the wellsite surface down through the drill string to the drill bit. The drilling fluid lubricates and cools the drill bit, and carries drill cuttings from the wellbore back to the wellsite surface. The drilling fluid returning to the surface may then be cleaned and again pumped through the drill string.

Mud pumps are typically reciprocating pumps comprising reciprocating fluid displacing members (e.g., pistons, plungers, diaphragms, etc.) driven by a crankshaft into and out of a fluid pressurizing chamber to alternatingly draw in, pressurize, and expel drilling fluid from the fluid pressurizing chamber. Each reciprocating member discharges the drilling fluid from its fluid pressurizing chamber in an oscillating manner, resulting in suction and discharge valves of the pumps alternatingly opening and closing during pumping operations. Several mud pumps may be connected in parallel to a single manifold, flow line, or well and utilized during drilling operations.

Success of pumping operations may be related to many factors, including physical size, flow rate, failure rates, and safety. Due to high pressures and abrasive properties of certain fluids, the inlet (i.e., suction) and outlet (i.e., discharge) valves, associated sealing components, or other portions of the pumps may become worn or eroded and, therefore, leak during pumping operations. Such defects are often detected late, resulting in pump failures during pumping operations and/or severe damage to the pumps and other equipment. Interruptions during pumping operations may reduce the efficiency of the pumping and, thus, drilling operations.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a system for monitoring operational health of a pump operable to pump a fluid at a wellsite. The pump is or comprises a reciprocating pump. The system includes a pressure sensor, a position sensor, and a processing device. The pressure sensor is disposed in association with the pump and is operable to facilitate determination of pressure measurements of the fluid at a fluid inlet manifold and/or a fluid outlet manifold of the pump during pumping operations. The position sensor is disposed in association with the pump and is operable to facilitate determination of position measurements of fluid displacing members of the pump during pumping operations. The processing device includes a processor and memory storing computer program code and is communicatively connected with the pressure sensor and the position sensor. The processing device is operable to receive the pressure and position measurements, detect irregular pressure measurements based on the received pressure measurements, determine operational phase of the pump based on the received position measurements, and determine which of fluid inlet and outlet valves of the pump is leaking based on operational phase during which the irregular pressure measurements are detected.

The present disclosure also introduces a method including commencing operation of a processing device to monitor operational health of a pump for pumping a fluid at a wellsite. The pump is a reciprocating pump. During pumping operations of the pump, the processing device receives pressure measurements of the fluid at a fluid inlet manifold and/or a fluid outlet manifold of the pump, receives position measurements of fluid displacing members of the pump, detects irregular pressure measurements based on the received pressure measurements, determines operational phase of the pump based on the received position measurements, and determines which of fluid inlet and outlet valves of the pump is leaking based on operational phase during which the irregular pressure measurements are detected.

The present disclosure also introduces a method including commencing operation of a processing device to monitor operational health of a pump for pumping a fluid at a wellsite. The pump is a reciprocating pump. During pumping operations of the pump, the processing device receives pressure measurements of the fluid at a fluid inlet manifold and/or a fluid outlet manifold of the pump, receives vibration measurements of impacts generated by fluid inlet and outlet valves of the pump when closing, detects irregular pressure measurements based on the received pressure measurements, determines operational phase of the pump based on the received vibration measurements (the operational phase of the pump being defined by which of the fluid inlet and outlet valves of the pump is closed), and determines which of fluid inlet and outlet valves of the pump is leaking based on operational phase during which the irregular pressure measurements are detected.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
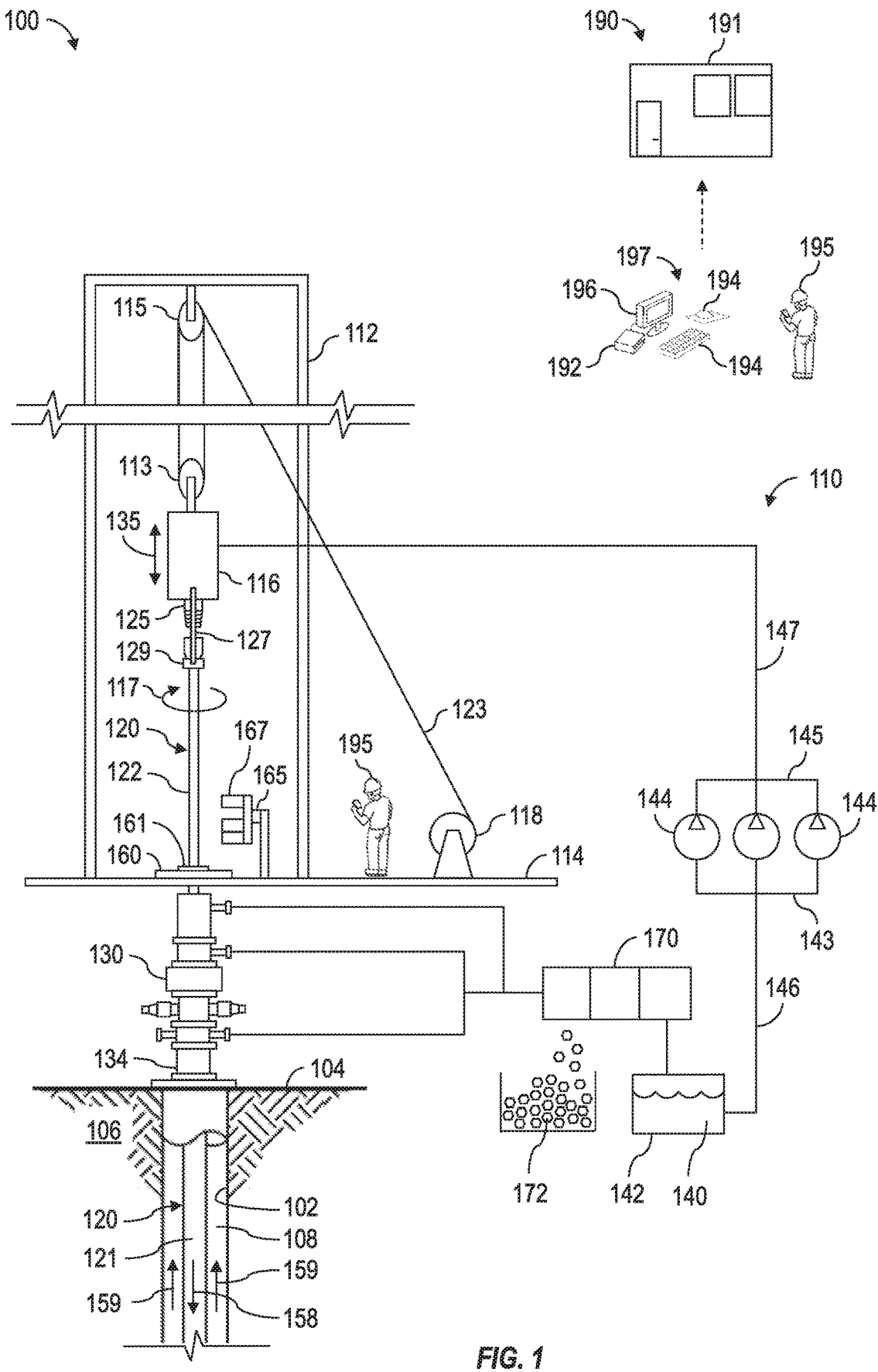
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Systems and methods (e.g., processes, operations) according to one or more aspects of the present disclosure may be utilized or otherwise implemented in association with an automated well construction system (e.g., a drilling rig) at an oil and gas wellsite, such as for constructing a wellbore to obtain hydrocarbons (e.g., oil and/or gas) from a subterranean formation. However, one or more aspects of the present disclosure may be utilized or otherwise implemented in association with other automated systems in the oil and gas industry and other industries. For example, one or more aspects of the present disclosure may be implemented in association with wellsite systems for performing fracturing, cementing, acidizing, chemical injecting, and/or water jet cutting operations, among other examples. One or more aspects of the present disclosure may also be implemented in association with mining sites, building construction sites, and/or other work sites where automated machines or equipment are utilized.

FIG. 1 is a schematic view of at least a portion of an example implementation of a well construction system 100 according to one or more aspects of the present disclosure. The well construction system 100 represents an example environment in which one or more aspects of the present disclosure described below may be implemented. The well construction system 100 may be or comprise a drilling rig and associated wellsite equipment. Although the well construction system 100 is depicted as an onshore implementation, the aspects described below are also applicable to offshore implementations.

The well construction system 100 is depicted in relation to a wellbore 102 formed by rotary and/or directional drilling from a wellsite surface 104 and extending into a subterranean formation 106. The well construction system 100 includes surface equipment 110 located at the wellsite surface 104 and a drill string 120 suspended within the wellbore 102. The surface equipment 110 may include a mast, a derrick, and/or another support structure 112 disposed over a rig floor 114. The drill string 120 may be suspended within the wellbore 102 from the support structure 112. The support structure 112 and the rig floor 114 are collectively supported over the wellbore 102 by legs and/or other support structures (not shown).

The drill string 120 may comprise a bottom-hole assembly (BHA) (not shown) and means 122 for conveying the BHA within the wellbore 102. The conveyance means 122 may comprise a plurality of individual tubulars, such as drill pipe, drill collars, heavy-weight drill pipe (HWDP), wired drill pipe (WDP), tough logging condition (TLC) pipe, and/or other means for conveying the BHA within the wellbore 102. A downhole end of the BHA may include or be coupled to a drill bit (not shown). Rotation of the drill bit and the weight of the drill string 120 collectively operate to form the wellbore 102.

The support structure 112 may support a driver, such as a top drive 116, operable to connect (perhaps indirectly) with an upper end of the drill string 120, and to impart rotary motion 117 and vertical motion 135 to the drill string 120, including the drill bit. However, another driver, such as a kelly (not shown) and a rotary table 160, may be utilized in addition to or instead of the top drive 116 to impart the rotary motion 117 to the drill string 120. The top drive 116 and the connected drill string 120 may be suspended from the support structure 112 via a hoisting system or equipment, which may include a traveling block 113, a crown block 115, and a draw works 118 storing a support cable or line 123.

The top drive 116 may comprise a grabber, a swivel (neither shown), elevator links 127 terminating with an elevator 129, and a drive shaft 125 operatively connected with a prime mover (not shown). The drive shaft 125 may be selectively coupled with the upper end of the drill string 120 and the prime mover may be selectively operated to rotate the drive shaft 125 and the drill string 120 coupled with the drive shaft 125. Hence, during drilling operations, the top drive 116, in conjunction with operation of the draw works 118, may advance the drill string 120 into the formation 106 to form the wellbore 102. The elevator links 127 and the elevator 129 of the top drive 116 may handle tubulars (e.g., drill pipes, drill collars, casing joints, etc.) that are not mechanically coupled to the drive shaft 125. For example, when the drill string 120 is being tripped into or out of the wellbore 102, the elevator 129 may grasp the tubulars of the drill string 120 such that the tubulars may be raised and/or lowered via the hoisting equipment mechanically coupled to the top drive 116.

An iron roughneck 165 may be positioned on the rig floor 114. The iron roughneck 165 may comprise a torqueing portion 167, such as may include a spinner and a torque wrench comprising a lower tong and an upper tong. The torqueing portion 167 of the iron roughneck 165 may be moveable toward and at least partially around the drill string 120, such as may permit the iron roughneck 165 to make up and break out connections of the drill string 120. The torqueing portion 167 may also be moveable away from the drill string 120, such as may permit the iron roughneck 165 to move clear of the drill string 120 during drilling operations.

A set of slips 161 may be located on the rig floor 114, such as may accommodate therethrough the drill string 120 during tubular make up and break out operations, tubular running operations, and the drilling operations. The slips 161 may be in an open position during running and drilling operations to permit advancement of the drill string 120, and in a closed position to clamp the upper end (e.g., uppermost tubular) of the drill string 120 to thereby suspend and prevent advancement of the drill string 120 within the wellbore 102, such as during the make up and break out operations.

The well construction system 100 may further include a drilling fluid circulation system or equipment operable to circulate fluids between the surface equipment 110 and the drill bit during drilling and other operations. For example, the drilling fluid circulation system may be operable to inject a drilling fluid from the wellsite surface 104 into the wellbore 102 via an internal fluid passage 121 extending longitudinally through the drill string 120. The drilling fluid circulation system may comprise a pit, a tank, and/or other fluid container 142 holding the drilling fluid (i.e., mud) 140, and one or more pump units 144 operable to move the drilling fluid 140 from the container 142 into the wellbore 102. The drilling fluid 140 may be drawn from the container 142 via a suction fluid conduit 146 and distributed among the pump units 144 via a suction manifold 143. The drilling fluid 140 may be discharged from the pump units 144 into a discharge manifold 145 and transferred to the top drive 116 via a discharge fluid conduit 147. The drilling fluid 140 may then flow through an internal passage of the top drive 116 into the fluid passage 121 of the drill string 120.

During drilling operations, the drilling fluid may continue to flow downhole through the internal passage 121 of the drill string 120, as indicated by directional arrow 158. The drilling fluid may exit the BHA via ports in the drill bit and then circulate uphole through an annular space 108 of the wellbore 102 defined between an exterior of the drill string 120 and the sidewall of the wellbore 102, such flow being indicated by directional arrows 159. In this manner, the drilling fluid lubricates the drill bit and carries formation cuttings uphole to the wellsite surface 104.

The well construction system 100 may further include fluid control equipment 130 for maintaining well pressure control and for controlling fluid being discharged from the wellbore 102. The fluid control equipment 130 may be mounted on top of a wellhead 134. The returning drilling fluid may exit the annulus 108 via one or more valves of the fluid control equipment 130, such as a bell nipple, a rotating control device (RCD), and/or a ported adapter (e.g., a spool, cross adapter, a wing valve, etc.) located below one or more portions of a blowout preventer (BOP) stack. The returning drilling fluid may then pass through drilling fluid reconditioning equipment 170 to be cleaned of drill cuttings 172 (i.e., formation particles) and reconditioned before returning to the fluid container 142.

The surface equipment 110 of the well construction system 100 may also comprise a control center 190 from which various portions of the well construction system 100, such as the top drive 116, the hoisting system, the tubular handling system, the drilling fluid circulation system, the well control system, the BHA, among other examples, may be monitored and controlled. The control center 190 may be located on the rig floor 114 or another location of the well construction system 100, such as the wellsite surface 104. The control center 190 may comprise a facility 191 (e.g., a room, a cabin, a trailer, etc.) containing a control workstation 197, which may be operated by a human wellsite operator 195 to monitor and control various wellsite equipment or portions of the well construction system 100. The control workstation 197 may comprise or be communicatively connected with a processing device 192 (e.g., a controller, a computer, etc.), such as may be operable to receive, process, and output information to monitor operations of and provide control to one or more portions of the well construction system 100. For example, the processing device 192 may be communicatively connected with the various surface and downhole equipment described herein, and may be operable to receive signals from and transmit signals to such equipment to perform various operations described herein. The processing device 192 may store executable program code, instructions, and/or operational parameters or setpoints, including for implementing one or more aspects of methods and operations described herein. The processing device 192 may be located within and/or outside of the facility 191.

The control workstation 197 may be operable for entering or otherwise communicating control commands to the processing device 192 by the wellsite operator 195, and for displaying or otherwise communicating information from the processing device 192 to the wellsite operator 195. The control workstation 197 may comprise a plurality of human-machine interface (HMI) devices, including one or more input devices 194 (e.g., a keyboard, a mouse, a joystick, a touchscreen, etc.) and one or more output devices 196 (e.g., a video monitor, a touchscreen, a printer, audio speakers, etc.). Communication between the processing device 192, the input and output devices 194, 196, and the various wellsite equipment may be via wired and/or wireless communication means. However, for clarity and ease of understanding, such communication means are not depicted, and a person having ordinary skill in the art will appreciate that such communication means are within the scope of the present disclosure.

Well construction systems within the scope of the present disclosure may include more or fewer components than as described above and depicted in FIG. 1. Additionally, various equipment and/or subsystems of the well construction system 100 shown in FIG. 1 may include more or fewer components than as described above and depicted in FIG. 1. For example, various engines, motors, hydraulics, actuators, valves, and/or other components not explicitly described herein may be included in the well construction system 100, and are within the scope of the present disclosure.

The present disclosure is further directed to various implementations of systems and/or methods for monitoring operational health of fluid inlet (i.e., suction) and outlet (i.e., discharge) valves of a fluid pump. For example, the systems and/or methods according to one or more aspects of the present disclosure may be operable to detect or determine which of the fluid inlet and outlet valves are leaking, regardless of the cause of the leakage (e.g., wear, debris, improper seating, etc.). Such systems and/or methods may be further operable to detect or determine the physical condition (e.g., level or progression of wear, degradation, and/or deterioration, severity of leakage, etc.) of the fluid inlet and outlet valves. Such systems and/or methods may be operable to monitor (e.g., receive, analyze, and/or record) operational parameters of the pumps during pumping operations and then determine the operational health of the fluid inlet and outlet valves based on the monitored operational parameters. Sensor measurements of the operational parameters may be taken during operational health monitoring from which the operational health condition may be derived. The operational measurements may be taken by various sensors (e.g., vibration, pressure, etc.) located in association with each of the pumps. Current operational measurements may then be compared to historical (baseline) operational measurements. Several (e.g., successive) operational measurements taken over time may be compared to determine current operational health of the fluid inlet and outlet valves.

Figure 2:
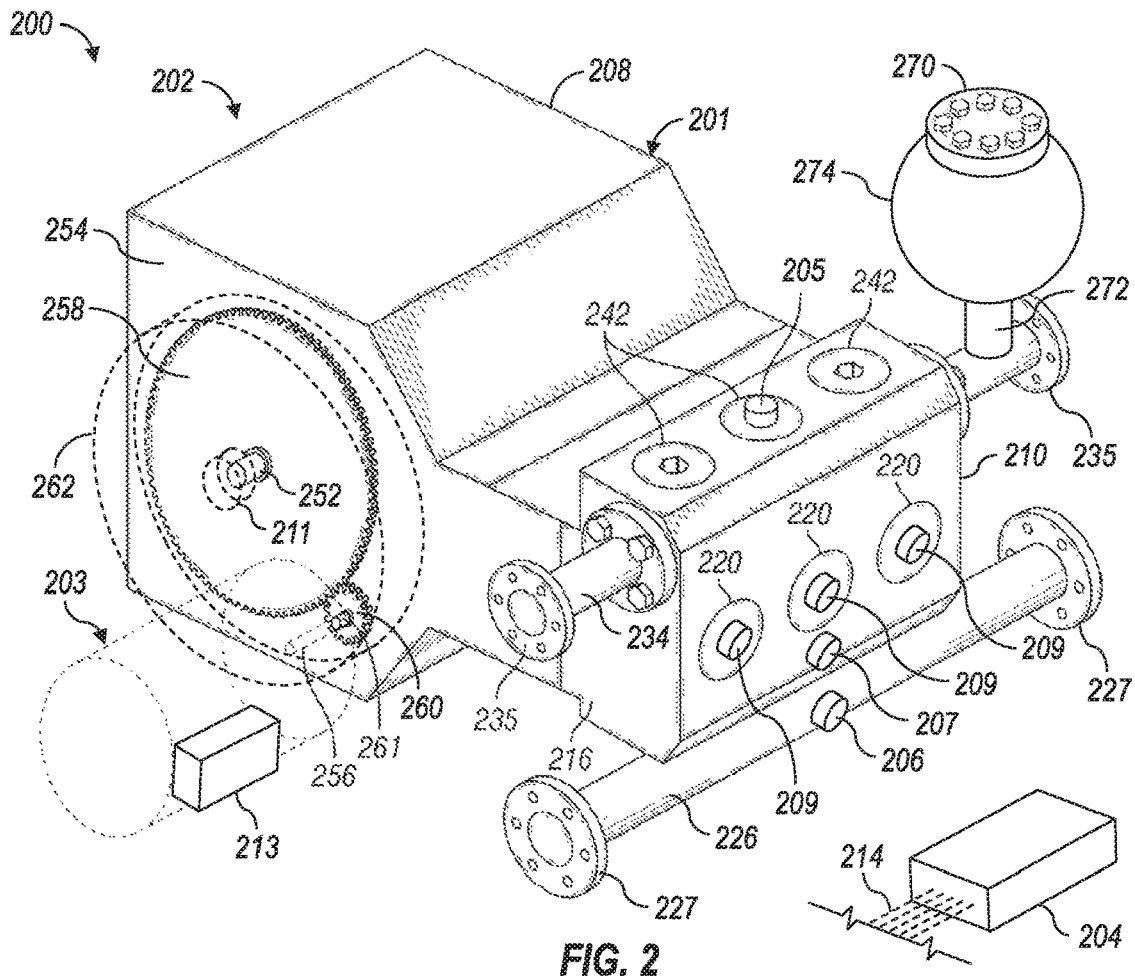
FIG. 2 is a perspective view of an example implementation of apparatus according to one or more aspects of the present disclosure.
Figure 3:
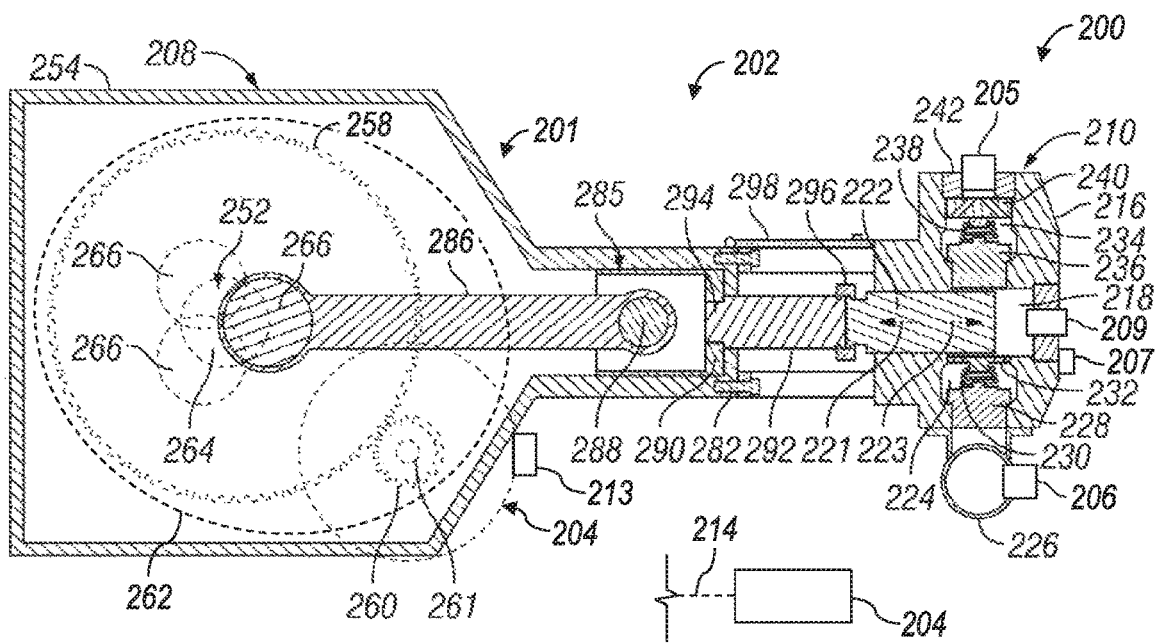
FIG. 3 is a side sectional view of the apparatus shown in FIG. 2.

FIGS. 2 and 3 are perspective and side sectional views, respectively, of at least a portion of an example implementation of a monitoring system 200 for monitoring operational parameters experienced and/or generated by a pump unit 202 and determining operational health of the pump unit 202 according to one or more aspects of the present disclosure. Portions of the pump unit 202 are shown in phantom lines, such as to prevent obstructing from view other portions of the pump unit 202. The monitoring system 200 may form a portion of or operate in conjunction with the well construction system 100 shown in FIG. 1. For example, the pump unit 202 may be or comprise one of the pump units 144 shown in FIG. 1. The monitoring system 200 may, thus, comprise one or more features of the well construction system 100 shown in FIG. 1. Accordingly, the following description refers to FIGS. 1-3, collectively.

The monitoring system 200 may comprise a processing device 204, such as a programmable logic controller (PLC), a computer (PC), an industrial computer (IPC), or a controller equipped with control logic, communicatively connected with various sensors of the pump unit 202 and/or of the monitoring system 200. The processing device 204 may be in real-time communication with such sensors and utilized to monitor various portions, components, and equipment of the pump unit 202. The processing device 204 may be or form at least a portion of the processing device 192 shown in FIG. 1. Communication between the processing device 204 and the sensors, actuators, and other controllers may be via wired and/or wireless communication means 214. However, for clarity and ease of understanding, such communication means 214 are not wholly depicted, and a person having ordinary skill in the art will appreciate that such communication means are within the scope of the present disclosure.

The pump unit 202 comprises a fluid pump 201 operatively coupled with and actuated by a prime mover 203. The pump 202 includes a power section 208 and a fluid section 210. The fluid section 210 may comprise a fluid end module 216 (e.g., block, housing) having a plurality of fluid pressurizing chambers 218. One end of each fluid pressurizing chamber 218 may be plugged by a cover plate 220, such as may be threadedly engaged with the fluid end module 216 and an opposite end of each fluid pressurizing chamber 218 may contain a reciprocating fluid displacing member 222 slidably disposed therein and operable to displace the fluid within the corresponding fluid pressurizing chamber 218. Although the fluid displacing member 222 is depicted as a plunger, the fluid displacing member 222 may also be implemented as a piston, diaphragm, or another reciprocating fluid displacing member.

Each fluid pressurizing chamber 218 comprises or is fluidly connected with a corresponding fluid inlet cavity 224 configured for communicating fluid from a common fluid inlet 226 (e.g., inlet manifold, suction manifold) into the fluid pressurizing chamber 218. The fluid inlet 226 may comprise or terminate with one or more fluid connectors 227, each of which may be fluidly connected with a source of fluid (e.g., drilling fluid) via a corresponding fluid conduit. An inlet (i.e., suction) valve 228 may selectively fluidly isolate each fluid pressurizing chamber 218 from the fluid inlet 226 to selectively control fluid flow from the fluid inlet 226 into each fluid pressurizing chamber 218. Each inlet valve 228 may be disposed within a corresponding fluid inlet cavity 224 or otherwise between each fluid inlet cavity 224 and the corresponding fluid pressurizing chamber 218. Each inlet valve 228 may be biased toward a closed flow position by a spring or another biasing member 230, which may be held in place by an inlet valve stop 232. Each inlet valve 228 may be actuated to an open flow position by a predetermined differential pressure between the corresponding fluid pressurizing chamber 218 and the fluid inlet 226.

Each fluid pressurizing chamber 218 may be fluidly connected with a common fluid outlet 234 (e.g., outlet manifold, discharge manifold). The fluid outlet 234 may be or comprise a fluid cavity extending through the fluid end module 216 transverse to the fluid cambers 218. The fluid outlet 234 may comprise or terminate with one or more fluid connectors 235, each of which may be fluidly connected with a corresponding fluid conduit. An outlet (i.e., discharge) valve 236 may selectively fluidly isolate each fluid pressurizing chamber 218 from the fluid outlet 234 to selectively control fluid flow from each fluid pressurizing chamber 218 into the fluid outlet 234. Each outlet valve 236 may be disposed within the fluid outlet 234 or otherwise between each fluid pressurizing chamber 218 and the fluid outlet 234. Each outlet valve 236 may be biased toward a closed flow position by a spring or another biasing member 238, which may be held in place by an outlet valve stop 240. Each outlet valve 236 may be actuated to an open flow position by a predetermined differential pressure between the corresponding fluid pressurizing chamber 218 and the fluid outlet 234. The fluid outlet 234 may be plugged by cover plates 242, such as may be threadedly engaged with the fluid end module 216.

During pumping operations, portions of the power section 208 of the pump unit 202 may rotate in a manner that generates a reciprocating linear motion to longitudinally oscillate, reciprocate, or otherwise move each fluid displacing member 222 within the corresponding fluid pressurizing chamber 218. Each fluid displacing member 222 alternatingly decreases and increases pressure within each chamber 218, thereby alternatingly receiving (e.g., drawing) the fluid into and discharging (e.g., displacing) the fluid out of each fluid pressurizing chamber 218. With regard to each fluid displacing member 222, while the fluid displacing member 222 moves out of the fluid pressurizing chamber 218, as indicated by arrow 221, the pressure of the fluid inside the corresponding fluid pressurizing chamber 218 decreases, thus creating a differential pressure across the corresponding fluid inlet valve 228. The pressure differential operates to compress the biasing member 230, thus actuating the fluid inlet valve 228 to an open flow position to permit the fluid from the fluid inlet 226 to be drawn into or otherwise enter a fluid pressurizing chamber 218 via a corresponding fluid inlet cavity 224. The fluid enters the fluid pressurizing chamber 218 from the fluid inlet 226 while the fluid displacing member 222 continues to move longitudinally out of the fluid pressurizing chamber 218, as indicated by the arrow 221. When the fluid displacing member 222 reaches end of stroke and reverses direction, as indicated by the arrow 223, the fluid pressure within the fluid pressurizing chamber 218 increases above the fluid pressure within the fluid inlet 226, thereby permitting the biasing member 230 to actuate the fluid inlet valve 228 to the closed flow position. When the fluid displacing member 222 begins to move longitudinally back into the fluid pressurizing chamber 218, as indicated by arrow 223, the pressure of the fluid inside of fluid pressurizing chamber 218 begins to increase. The fluid pressure inside the fluid pressurizing chamber 218 continues to increase while the fluid displacing member 222 continues to move into the fluid pressurizing chamber 218 until the pressure of the fluid inside the fluid pressurizing chamber 218 is high enough to overcome the pressure of the fluid inside the fluid outlet 234 and compress the biasing member 238, thus actuating the fluid outlet valve 236 to the open flow position and permitting the pressurized fluid to move into the fluid outlet 234 and then out of the fluid outlet 234 via the fluid conduits fluidly connected with the fluid connectors 235.

The fluid flow rate generated by the pump unit 202 may depend on the physical size of the fluid displacing members 222 and fluid pressurizing chambers 218, as well as the pump unit operating speed, which may be defined by the speed or rate at which the fluid displacing members 222 reciprocate or otherwise alternatingly move into and out of the fluid pressurizing chambers 218. The pumping speed, such as the speed or the rate at which the fluid displacing members 222 move, may be related to the rotational speed of the power section 208 and/or the prime mover 203. Accordingly, the fluid flow rate generated by the pump unit 202 may be controlled by controlling the rotational speed of the power section 208 and/or the prime mover 203.

The prime mover 203 may comprise an engine, such as a gasoline engine or a diesel engine, an electric motor, such as a synchronous or asynchronous electric motor, including a synchronous permanent magnet motor, a hydraulic motor, or another prime mover operable to drive or otherwise rotate a crankshaft 252 of the power section 208. The crankshaft 252 may be enclosed and maintained in position by a power section housing 254. To prevent relative rotation between the power section housing 254 and the prime mover 203, the power section housing 254 and prime mover 203 may be fixedly coupled together or to a common base, such as a skid or mobile trailer.

The prime mover 203 may comprise a rotatable output shaft 256 operatively (i.e., mechanically) connected with the crankshaft 252 via a gear train or transmission 262, which may comprise at a spur gear 258 coupled with the crankshaft 252 and a corresponding pinion gear 260 coupled with a support shaft 261. The output shaft 256 of the prime mover 203 and the support shaft 261 may be coupled, such as may facilitate transfer of torque from the prime mover 203 to the support shaft 261 and the pinion gear 260 connected with the support shaft 261. The pinion gear 260 may then transfer torque to the spur gear 258 and the crankshaft 252 connected with the spur gear 258. For clarity, FIGS. 2 and 3 show the transmission 262 comprising a single spur gear 258 engaging a single pinion gear 260, however, it is to be understood that the transmission 262 comprises a plurality of corresponding sets of gears, such as may permit the transmission 262 to be shifted between different gear sets (i.e., combinations) to control the operating speed of the crankshaft 252 and torque transferred to the crankshaft 252. Accordingly, the transmission 262 may be shifted between different gear sets ("gears") to vary the pumping speed and torque of the power section 208 to vary the fluid flow rate and maximum fluid pressure generated by the fluid section 210 of the pump unit 202. The transmission 262 may also comprise a torque converter (not shown) operable to selectively connect ("lock-up") the prime mover 203 with the transmission 262 and permit slippage ("unlock") between the prime mover 203 and the transmission 262. The torque converter and the gears of the transmission 262 may be shifted manually by a human wellsite operator or remotely via a gear shifter, which may be incorporated as part of a pump unit controller 213. The gear shifter may receive control signals from the processing device 204 and output a corresponding electrical or mechanical control signal to shift the gear of the transmission 262 and lock-up the transmission, such as to control the fluid flow rate and the operating pressure of the pump unit 202. Although the pump unit 202 is shown comprising a transmission 262 comprising gears 258, 260, the pump unit 202 may utilize a belt (not shown) to transfer torque from the prime mover output shaft 256 to the crankshaft 252 of the fluid pump 201.

The crankshaft 252 may be implemented as a crankshaft comprising a plurality of axial journals 264 and offset journals 266. The axial journals 264 may extend along a central axis of rotation of the crankshaft 252, and the offset journals 266 may be offset from the central axis of rotation by a distance and spaced 120 degrees apart with respect to the axial journals 264. The crankshaft 252 may be supported in position within the power section 208 by the power section housing 254, wherein two of the axial journals 264 may extend through opposing openings in the power section housing 254.

The power section 208 and the fluid section 210 may be coupled or otherwise connected together. For example, the fluid end module 216 may be fastened with the power section housing 254 by a plurality of threaded fasteners 282. The fluid pump 201 may further comprise an access door 298, which may facilitate access to portions of the fluid pump 201 located between the power section 208 and the fluid section 210, such as during assembly and/or maintenance of the fluid pump 201.

A plurality of crosshead mechanisms 285 may be utilized to transform and transmit the rotational motion of the crankshaft 252 to a reciprocating linear motion of the fluid displacing members 222. For example, each crosshead mechanism 285 may comprise a connecting rod 286 pivotally coupled with a corresponding offset journal 266 at one end and with a pin 288 of a crosshead 290 at an opposing end. During pumping operations, walls and/or interior portions of the power section housing 254 may guide each crosshead 290, such as may prevent or inhibit lateral motion of each crosshead 290. Each crosshead mechanism 285 may further comprise a piston rod 292 coupling the crosshead 290 with the fluid displacing member 222. The piston rod 292 may be coupled with the crosshead 290 via a threaded connection 294 and with the fluid displacing member 222 via a flexible connection 296.

The pump unit 202 may comprise a pressure pulsation dampener 270, which may be fluidly connected with or along the fluid outlet 234 of the fluid pump 201 to dissipate or otherwise reduce magnitude (i.e., amplitude) of the pressure pulsations (i.e., fluctuations) within the drilling fluid discharged from the fluid pump 201. The pulsation dampener 270 may comprise a pressure vessel 274 having an internal chamber containing a gas-charged bladder (not shown) and fluid port 272 through which the internal chamber may receive the fluid (e.g., drilling fluid) being discharged via the fluid outlet 234.

The monitoring system 200 may further comprise a plurality of sensors 205, 206, 207, 209, 211, each operatively connected with and/or disposed in association with the pump unit 202. Each sensor 205, 206, 207, 209, 211 may be operable to generate a sensor signal or information that is indicative of or operable to facilitate determination of a sensor measurement of an operational parameter of the pump unit 202.

For example, the monitoring system 200 may comprise pressure sensors 205, 206, each operable to generate a sensor signal indicative of or operable to facilitate determination of a pressure measurement of fluid within a corresponding portion of the fluid pump 201. The pressure sensor 205 may be disposed or installed in association with, for example, the fluid outlet 234, such as may permit pressure measurement of the fluid within or at the fluid outlet 234 while the fluid is being discharged from the fluid pressurizing chambers 218 of the pump 201. The pressure sensor 205 may extend through one or more of the cover plates 242 or other portions of the corresponding fluid end module 216 to monitor pressure within or at the fluid outlet 234. The pressure sensor 206 may be disposed or installed in association with, for example, the fluid inlet 226, such as may permit pressure measurement of the fluid within or at the fluid inlet 226 while the fluid is being drawn into the fluid pressurizing chambers 218 of the pump 201.

The monitoring system 200 may further comprise one or more vibration (e.g., acceleration) sensors 207 (e.g., strain gauge accelerometers, piezoelectric vibration sensors, etc.), each operable to generate a sensor signal or information indicative of or operable to facilitate determination of vibration measurement experienced or generated by the fluid pump 201. The vibration sensor 207 may be single axis and/or multi axis vibration sensor disposed or installed in association with, for example, the fluid end module 216 of the fluid section 210. The vibration sensor 207 may be operable to generate a sensor signal or information indicative of or operable to facilitate determination of amplitude, phase, and/or frequency of vibrations experienced by the fluid section 210, which in turn may be indicative of operational phase and frequency of pumping operations and/or closing of the fluid inlet and fluid outlet valves 228, 236.

The monitoring system 200 may further comprise a rotational position sensor 211 operable to generate a sensor signal or information indicative of or operable to facilitate determination of rotational position measurements of a corresponding portion of the pump unit 202. The rotational position sensor 211 may be disposed or installed in association with, for example, the crankshaft 252 or another rotating portion of the power section 208 to convert angular position or motion of the crankshaft 252 to an electrical signal indicative of operational position of the fluid displacing members 222 and, thus, operational phase of the pump 201. The rotary sensor 211 may also or instead be mounted in association of the prime mover 203 to monitor the rotational position of the prime mover 203, which may be utilized to determine the operational position of the fluid displacing members 222. The rotational position measurements facilitated by the rotational position sensors 211 may be further indicative of rotational speed and rotational acceleration of the crankshaft 252 and the fluid displacing members 222. The rotational position sensors 211 may be or comprise, for example, encoders, rotary potentiometers, and rotary variable-differential transformers (RVDTs).

The monitoring system 200 may also comprise position sensors 209, each operable to generate a sensor signal or information indicative of or operable to facilitate determination of a position measurement of a corresponding one of the fluid displacing members 222. Each position sensor 209 may be associated with a corresponding portion of the fluid pump 201 and operable to convert position or presence (at a certain position) of a corresponding fluid displacing member 222 or other rotating or otherwise moving component (e.g., the crosshead 290) of the fluid pump 201 to a signal or information indicative of or operable to facilitate determination of the position measurement of the fluid displacing member 222. Each position sensor 209 may be disposed adjacent a fluid displacing member 222 or otherwise disposed in association with the fluid displacing member 222 in a manner permitting sensing of the position or presence of the fluid displacing member 222 during pumping operations. For example, each position sensor 209 may extend through the cover plate 220 or another portion of the fluid end module 216 into a corresponding fluid pressurizing chamber 218 in a manner permitting detection of the presence of the corresponding fluid displacing member 222 at a selected or predetermined position. The angular position associated with the operation of the pump assembly 200 may be determined by measuring one position, such as top dead center or bottom dead center of the fluid displacing member 222, and estimating the operational phase of the fluid displacing member 222 when positioned away from the top dead center or bottom dead center positions. However, the position measurement (e.g., presence detection) facilitated by the position sensors 209 may also or instead be utilized as reference points, such as top dead centers or bottom dead centers of the fluid displacing members 222, for the position measurements facilitated by the rotary position sensor 211. The position of the fluid displacing members 222 when positioned away from the top dead center or bottom dead center positions may then be determined with additional accuracy and precision based on the measurements facilitated by the rotary position sensor 211. One or more of the position sensors 209 may also or instead be disposed adjacent the crosshead mechanisms 285 or the crankshafts 252 in a manner permitting the detection of the presence and/or movement of a portion of the crosshead mechanism 285 or the crankshaft 252 and, therefore, the position measurement of the corresponding fluid displacing member 222 during pumping operations. The determined position of each fluid displacing member 222 may be utilized to determine operational positions (i.e., open or closed) of the corresponding fluid inlet and outlet valves 228, 236. The position measurements facilitated by the position sensors 209 may be further indicative of speed and acceleration of the fluid displacing members 222. Each position sensor 209 may be or comprise a proximity sensor, a linear encoder, a capacitive sensor, an inductive sensor, a magnetic sensor, a Hall effect sensor, and/or a reed switch, among other examples.

The pump unit controller 213 may further include prime mover power and/or control components, such as a variable frequency drive (VFD) and/or an engine throttle control, which may be utilized to facilitate control of the prime mover 203. The VFD and/or throttle control may be connected with or otherwise in communication with the prime mover 203 via mechanical and/or electrical communication means (not shown). The pump unit controller 213 may include the VFD in implementations in which the prime mover 203 is or comprises an electric motor and the pump unit controller 213 may include the engine throttle control in implementations in which the prime mover 203 is or comprises an engine. For example, the VFD may receive control signals from the processing device 204 and output corresponding electrical power to control the speed and the torque output of the prime mover 203 and, thus, control the pumping speed and fluid flow rate of the pump unit 202, as well as the maximum pressure generated by the pump 201. The throttle control may receive control signals from the processing device 204 and output a corresponding electrical or mechanical throttle control signal to control the speed of the prime mover 203 to control the pumping speed and, thus, the fluid flow rate generated by the pump 201. Although the pump unit controller 213 is shown located near or in association with the prime mover 203, the pump unit controller 213 may be located or disposed at a distance from the prime mover 203. For example, the pump unit controller 213 may be implemented as part of the processing device 204 and/or located within or form a portion of a wellsite control center 190 (e.g., control cabin, control trailer, etc.).

The processing device 204 may be further operable to monitor and control various operational parameters of the pump unit 202. The processing device 204 may be in communication with the various sensors of the pump unit 202 including the pressure sensors 205, 206, the vibration sensor 207, the position sensors 209, and the rotational position sensor 211 to facilitate monitoring of the pump unit 202. The processing device 204 may be in communication with the transmission 262 via the gear shifter of the pump unit controller 213, such as to control the operational speed and phase of the pump unit 202, as well as flow rate and pressure generated by the pump unit 202 to facilitate control of the pump unit 202. The processing device 204 may also be in communication with the prime mover 203 via the VFD of the pump unit controller 213 if the prime mover 203 is an electric motor or via the throttle control of the pump unit controller 213 if the prime mover 203 is an engine, such as may permit the processing device 204 to activate, deactivate, and control the operational speed and phase of the pump 201, as well as to control the flow rate and pressure generated by the pump 201.

Although FIGS. 2 and 3 show the pump 201 comprising a triplex reciprocating fluid pump, which has three fluid pressurizing chambers 218 and three fluid displacing members 222, implementations of the monitoring system 200 within the scope of the present disclosure may be utilized to monitor operational health of other pumps, such as a quintuplex reciprocating pump having five fluid pressurizing chambers 218, five sets of inlet and outlet valves 228, 236, and five fluid displacing members 222, or a pump having other quantities of fluid pressurizing chambers 218, inlet and outlet valves 228, 236, and fluid displacing members 222. It is further noted that the fluid pump 201 described above and shown in FIGS. 2 and 3 is merely an example, and that other pumps, such as diaphragm pumps, gear pumps, external circumferential pumps, internal circumferential pumps, lobe pumps, and other positive displacement pumps may also be monitored by a monitoring system according to one or more aspects of the present disclosure. It is also noted that the pump 201 may be utilized for pumping various fluids during various operations. For example, the pump 201 may be utilized to pump a fracturing fluid during well fracturing operations. The pump 201 may also or instead be utilized to pump a drilling fluid during well drilling operations. The pump 201 may also or instead be utilized to pump a cement slurry during well cementing operations. The pump 201 may also or instead be utilized to pump an acid or other liquid chemicals during chemical injection or other stimulation operations. The pump 201 may also or instead be utilized to pump water or another aqueous solution during water jet cutting operations.

The present disclosure is further directed to example monitoring systems, such as the monitoring system 200, for performing operational health monitoring of a fluid pump, such as the reciprocating pump 201, at a wellsite. The monitoring system may comprise a processing device, such as the processing device 204, which may be operable to receive the pressure measurements facilitated by the pressure sensors 205, 206 and the position measurements facilitated by one or both of the position sensors 209, 211, detect irregular pressure measurements based on the received pressure measurements, determine operational phase of the pump 201 based on the received position measurements, and determine which of fluid inlet and outlet valves 228, 236 of the pump 201 is leaking based on operational phase during which the irregular pressure measurements are detected. The processing device 204 may be further operable to receive vibration measurements facilitated by the vibration sensor 207 disposed in association with the pump 201, and determine operational phase of the pump 201 further based on the vibration measurements. The operational phase of the pump 201 may be defined by which of the fluid inlet and outlet valves 228, 236 of the pump 201 is closed.

Determining operational phase of the pump 201 may comprise determining which of the fluid inlet and outlet valves 228, 236 of the pump 201 is closed based on the position measurements, and determining which of the fluid inlet and outlet valves 228, 236 of the pump 201 is leaking may comprise determining that an instance of the fluid inlet and outlet valves 228, 236 that is closed during the detected irregular pressure measurements is leaking. Determining that the instance of the fluid inlet and outlet valves 228, 236 that is closed during the detected irregular pressure measurements is leaking may comprise determining that the instance of the fluid inlet and outlet valves 228, 236 that is closed during the detected irregular pressure measurements is leaking when the entirety of the operational phase during which the instance of the fluid inlet and outlet valves 228, 236 is closed coincides with the detected irregular pressure measurements. Determining operational phase of the pump 201 may comprise determining which of the fluid inlet and outlet valves 228, 236 of the pump 201 is closed based on the position measurements, and determining which of the fluid inlet and outlet valves of the pump is leaking may comprise determining that an instance of the fluid inlet and outlet valves 228, 236 that closes at about the same time the detected irregular pressure measurements start is leaking. Irregular pressure measurements may comprise pressure measurements that are lower than baseline pressure measurements or higher than the baseline pressure measurements.

The processing device 204 may be further operable to compare the irregular pressure measurements to baseline pressure measurements to determine a difference between the irregular pressure measurements and the baseline pressure measurements, and determine leak severity of the leaking one of the fluid inlet and outlet valves 228, 236 based on the difference. The processing device 204 may be operable to determine that the leak severity of the leaking one of the fluid inlet and outlet valves 228, 236 is low when the difference between the irregular pressure measurements and the baseline pressure measurements is less than a predetermined threshold quantity small. The processing device 204 may be operable to determine that the leak severity of the leaking one of the fluid inlet and outlet valves 228, 236 is high when the difference between the irregular pressure measurements and the baseline pressure measurements is equal to or greater than a predetermined threshold quantity.

Figure 4:
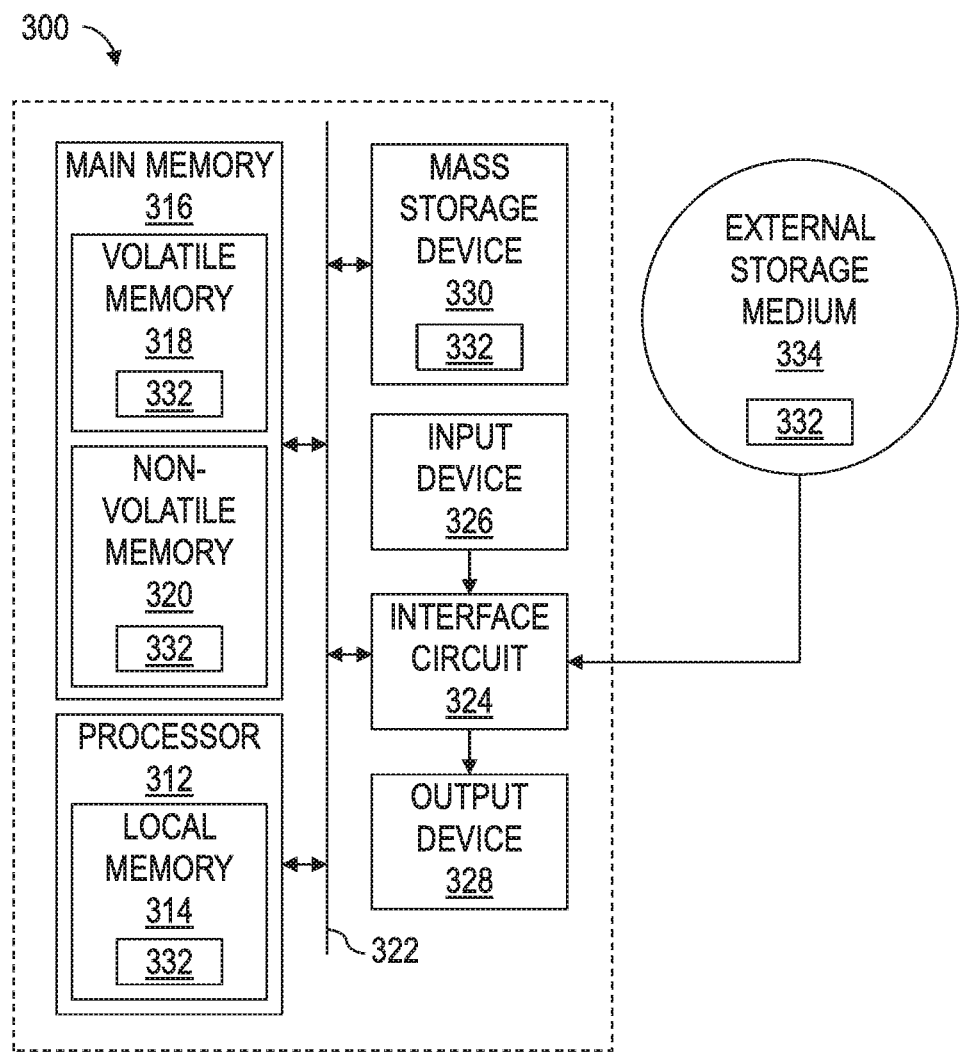
FIG. 4 is a schematic view of at least a portion of an example implementation of apparatus according to one or more aspects of the present disclosure.

FIG. 4 is a schematic view of at least a portion of an example implementation of a processing system 300 (or device) according to one or more aspects of the present disclosure. The processing system 300 may be or form at least a portion of one or more processing devices, equipment controllers, and/or other electronic devices shown in one or more of the FIGS. 1-3. Accordingly, the following description refers to FIGS. 1-4, collectively.

The processing system 300 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices. The processing system 300 may be or form at least a portion of the processing device 192, 204. The processing system 300 may be or form at least a portion of local controllers, such as the pump unit controllers 213. Although it is possible that the entirety of the processing system 300 is implemented within one device, it is also contemplated that one or more components or functions of the processing system 300 may be implemented across multiple devices, some or an entirety of which may be at the wellsite and/or remote from the wellsite.

The processing system 300 may comprise a processor 312, such as a general-purpose programmable processor. The processor 312 may comprise a local memory 314, and may execute machine-readable and executable program code instructions 332 (i.e., computer program code) present in the local memory 314 and/or another memory device. The processor 312 may execute, among other things, the program code instructions 332 and/or other instructions and/or programs to implement the example methods, processes, and/or operations described herein. For example, the program code instructions 332, when executed by the processor 312 of the processing system 300, may cause the monitoring system 200 to perform the example methods and/or operations described herein. The program code instructions 332, when executed by the processor 312 of the processing system 300, may also or instead cause the processor 312 to receive, record, and process (e.g., analyze) sensor data (e.g., sensor measurements), compare the sensor data, and output data and/or information indicative of operational health the pump units 144, 202.

The processor 312 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 312 include one or more INTEL microprocessors, microcontrollers from the ARM and/or PICO families of microcontrollers, embedded soft/hard processors in one or more FPGAs.

The processor 312 may be in communication with a main memory 316, such as may include a volatile memory 318 and a non-volatile memory 320, perhaps via a bus 322 and/or other communication means. The volatile memory 318 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 320 may be, comprise, or be implemented by read-only memory, flash memory, and/or other types of memory devices. One or more memory controllers (not shown) may control access to the volatile memory 318 and/or non-volatile memory 320.

The processing system 300 may also comprise an interface circuit 324, which is in communication with the processor 312, such as via the bus 322. The interface circuit 324 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 324 may comprise a graphics driver card. The interface circuit 324 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing system 300 may be in communication with various sensors, video cameras, actuators, processing devices, equipment controllers, and other devices of the well construction system via the interface circuit 324. The interface circuit 324 can facilitate communications between the processing system 300 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 326 may also be connected to the interface circuit 324. The input devices 326 may permit human wellsite operators 195 to enter the program code instructions 332, which may be or comprise control commands, operational parameters, pumping operations, operational health thresholds, and/or other operational setpoints. The program code instructions 332 may further comprise modeling or predictive routines, equations, algorithms, processes, applications, and/or other programs operable to perform example methods and/or operations described herein. The input devices 326 may be, comprise, or be implemented by a keyboard, a mouse, a joystick, a touchscreen, a track-pad, a trackball, an isopoint, and/or a voice recognition system, among other examples. One or more output devices 328 may also be connected to the interface circuit 324. The output devices 328 may permit for visualization or other sensory perception of various data, such as sensor data, status data, and/or other example data. The output devices 328 may be, comprise, or be implemented by video output devices (e.g., an LCD, an LED display, a CRT display, a touchscreen, etc.), printers, and/or speakers, among other examples. The one or more input devices 326 and the one or more output devices 328 connected to the interface circuit 324 may, at least in part, facilitate the HMIs described herein.

The processing system 300 may comprise a mass storage device 330 for storing data and program code instructions 332. The mass storage device 330 may be connected to the processor 312, such as via the bus 322. The mass storage device 330 may be or comprise a tangible, non-transitory storage medium, such as a floppy disk drive, a hard disk drive, a compact disk (CD) drive, and/or digital versatile disk (DVD) drive, among other examples. The processing system 300 may be communicatively connected with an external storage medium 334 via the interface circuit 324. The external storage medium 334 may be or comprise a removable storage medium (e.g., a CD or DVD), such as may be operable to store data and program code instructions 332.

As described above, the program code instructions 332 and other data (e.g., sensor data or measurements database) may be stored in the mass storage device 330, the main memory 316, the local memory 314, and/or the removable storage medium 334. Thus, the processing system 300 may be implemented in accordance with hardware (perhaps implemented in one or more chips including an integrated circuit, such as an ASIC), or may be implemented as software or firmware for execution by the processor 312. In the case of firmware or software, the implementation may be provided as a computer program product including a non-transitory, computer-readable medium or storage structure embodying computer program code instructions 332 (i.e., software or firmware) thereon for execution by the processor 312. The program code instructions 332 may include program instructions or computer program code that, when executed by the processor 312, may perform and/or cause performance of example methods, processes, and/or operations described herein.

The present disclosure is further directed to example methods or processes of performing operational health monitoring of a fluid pump, such as the reciprocating pump 201, via a monitoring system, such as the monitoring system 200, according to one or more aspects of the present disclosure. The example methods may be performed utilizing or otherwise in conjunction with at least a portion of one or more implementations of one or more instances of the apparatus shown in one or more of FIGS. 1-4, and/or otherwise within the scope of the present disclosure. For example, the methods may be performed and/or caused, at least partially, by a processing device, such as the processing device 204 executing program code instructions according to one or more aspects of the present disclosure. The methods may also or instead be performed and/or caused, at least partially, by a human wellsite operator utilizing one or more instances of the apparatus shown in one or more of FIGS. 1-4, and/or otherwise within the scope of the present disclosure. Thus, the following description of an example method refers to apparatus shown in one or more of FIGS. 1-4. However, the method may also be performed in conjunction with implementations of apparatus other than those depicted in FIGS. 1-4 that are also within the scope of the present disclosure. The following description refers to FIGS. 1-4, collectively.

The example methods or processes of performing operational health monitoring of the fluid pump 201 may include commencing operation of the processing device 204 to monitor operational health of the pump 201 for pumping a fluid at the wellsite 104. During pumping operations of the pump 201, the processing device 204 may receive pressure measurements of the fluid at the fluid inlet manifold 224 and/or a fluid outlet manifold 234 of the pump 201, receive position measurements of the fluid displacing members 222 of the pump 201, detect irregular pressure measurements based on the received pressure measurements, determine operational phase of the pump 201 based on the received position measurements, and determine which of the fluid inlet and outlet valves 228, 236 of the pump 201 is leaking based on operational phase during which the irregular pressure measurements are detected. The processing device 204 may further receive vibration measurements of impacts generated by fluid inlet and outlet valves 228, 236 of the pump 201 when closing, and determine operational phase of the pump 201 further based on the vibration measurements. The operational phase of the pump 201 may be defined by which of the fluid inlet and outlet valves 228, 236 of the pump 201 is closed.

Determining the operational phase of the pump 201 may comprise determining which of the fluid inlet and outlet valves 228, 236 of the pump 201 is closed based on the position measurements, and determining which of the fluid inlet and outlet valves 228, 236 of the pump 201 is leaking may comprise determining which of the fluid inlet and outlet valves 228, 236 is closed during the detected irregular pressure measurements. Determining the operational phase of the pump 201 may comprise determining which of the fluid inlet and outlet valves 228, 236 of the pump 201 is closed based on the position measurements, and determining which of the fluid inlet and outlet valves 228, 236 of the pump 201 is leaking may comprise determining which of the fluid inlet and outlet valves 228, 236 closes at about the same time the detected irregular pressure measurements start. Determining operational phase of the pump 201 may comprise determining which of the fluid inlet and outlet valves 228, 236 of the pump 201 is closed based on the position measurements, and determining which of the fluid inlet and outlet valves 228, 236 is closed during the detected irregular pressure measurements may comprise determining which of the fluid inlet and outlet valves 228, 236 closes at about the same time the detected irregular pressure measurements start and opens at about the same time the detected irregular pressure measurements stop. Irregular pressure measurements may comprise pressure measurements that are lower than baseline pressure measurements, or higher than the baseline pressure measurements.

The processing device 204 may further compare the irregular pressure measurements to baseline pressure measurements to determine a difference between the irregular pressure measurements and the baseline pressure measurements, and determine leak severity of the leaking one of the fluid inlet and outlet valves 228, 236 based on the difference. The processing device 204 may further determine that the leak severity of the leaking one of the fluid inlet and outlet valves 228, 236 is low when the difference between the irregular pressure measurements and the baseline pressure measurements is less than a predetermined threshold quantity. The processing device 204 may further determine that the leak severity of the leaking one of the fluid inlet and outlet valves 228, 236 is high when the difference between the irregular pressure measurements and the baseline pressure measurements is equal to or greater than a predetermined threshold quantity.

The example methods or processes of performing operational health monitoring of the fluid pump 201 may also or instead include commencing operation of the processing device 204, thereby causing the processing device 204 to receive pressure measurements of the fluid at the fluid inlet manifold and/or a fluid outlet manifold 224, 234 of the pump 201, receive vibration measurements of impacts generated by the fluid inlet and outlet valves 228, 236 of the pump 201 when closing, detect irregular pressure measurements based on the received pressure measurements, determine operational phase of the pump 201 based on the received vibration measurements, and determine which of fluid inlet and outlet valves 228, 236 of the pump 201 is leaking based on operational phase during which the irregular pressure measurements are detected. The processing device 204 may further receive position measurements of the fluid displacing members 222 of the pump 201 and determine operational phase of the pump 201 further based on the position measurements. The operational phase of the pump 201 may be defined by which of the fluid inlet and outlet valves 228, 236 of the pump 201 is closed.

Determining which of the fluid inlet and outlet valves 228, 236 of the pump 201 is leaking may comprise determining which of the fluid inlet and outlet valves 228, 236 is closed during the detected irregular pressure measurements. Determining which of the fluid inlet and outlet valves 228, 236 of the pump 201 is leaking may comprise determining which of the fluid inlet and outlet valves 228, 236 closes at about the same time the detected irregular pressure measurements start. Determining which of the fluid inlet and outlet valves 228, 236 of the pump 201 is leaking may comprise determining which of the fluid inlet and outlet valves 228, 236 closes at about the same time the detected irregular pressure measurements start, and opens at about the same time the detected irregular pressure measurements stop. Irregular pressure measurements may comprise pressure measurements that are lower than baseline pressure measurements, or higher than the baseline pressure measurements.

The processing device 204 may further compare the irregular pressure measurements to baseline pressure measurements to determine a difference between the irregular pressure measurements and the baseline pressure measurements, and determine leak severity of the leaking one of the fluid inlet and outlet valves based on the difference. The processing device 204 may further determine that the leak severity of the leaking one of the fluid inlet and outlet valves 228, 236 is low when the difference between the irregular pressure measurements and the baseline pressure measurements is less than a predetermined threshold quantity. The processing device 201 may further determine that the leak severity of the leaking one of the fluid inlet and outlet valves 228, 236 is high when the difference between the irregular pressure measurements and the baseline pressure measurements is equal to or greater than a predetermined threshold quantity.

Figure 5:
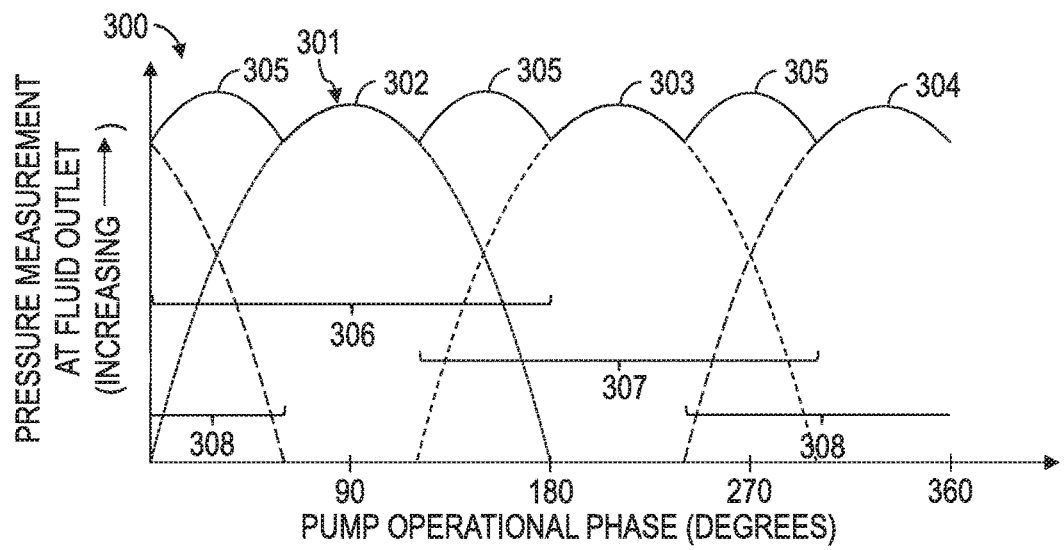
FIGS. 5-18 are graphs related to one or more aspects of the present disclosure.

FIG. 5 is a graph 300 showing an example profile of pressure measurements 301 of fluid (e.g., drilling fluid) at a fluid outlet (i.e., discharge) of an operationally healthy fluid pump. The pressure measurements 301 are shown plotted along the vertical axis, with respect to pump operational phase (e.g., pump cycle position, crankshaft position, fluid displacing member position), which is shown plotted along the horizontal axis. The pressure measurements 301 are associated with a triplex reciprocating pump (e.g., pump 201 shown in FIGS. 2 and 3) having three fluid displacing members reciprocating within corresponding fluid pressurizing chambers at 120 degrees out of phase. The pressure measurements 301 may be facilitated by pressure sensors (e.g., pressure sensors 205 shown in FIGS. 2 and 3) associated with the pump and received by a processing device (e.g., processing device 204 shown in FIGS. 2 and 3). The pump operational phase may be determined by the processing device based on position sensor measurements facilitated by position sensors (e.g., position sensors 209, 211 shown in FIGS. 2 and 3) associated with the pump.

The graph 300 shows a first pressure pulsation 302 being generated during phase period 306, during which a first fluid displacing member pressurizes the fluid within a first fluid pressurizing chamber causing a corresponding outlet (i.e., discharge) valve to open, a corresponding inlet (i.e., suction) valve to close, and the fluid to be discharged via (or into) a fluid outlet, thereby increasing the pressure at the fluid outlet. The graph 300 further shows a second pressure pulsation 303 being generated during phase period 307, during which a second fluid displacing member pressurizes the fluid within a second fluid pressurizing chamber causing a corresponding outlet valve to open, a corresponding inlet valve to close, and the fluid to be discharged via (or into) the fluid outlet, thereby increasing the pressure at the fluid outlet. The graph 300 still further shows a third pressure pulsation 304 being generated during phase period 308, during which a third fluid displacing member pressurizes the fluid within a third fluid pressurizing chamber causing a corresponding outlet valve to open, a corresponding inlet valve to close, and the fluid to be discharged via (or into) the fluid outlet, thereby increasing the pressure at the fluid outlet. The pressure pulsations 302, 303, 304 overlap, causing intermediate pressure pulsations 305 to be formed. The pressure pulsations 302, 303, 304, 305 result in or otherwise cause the pressure measurements 301.

Figure 6:
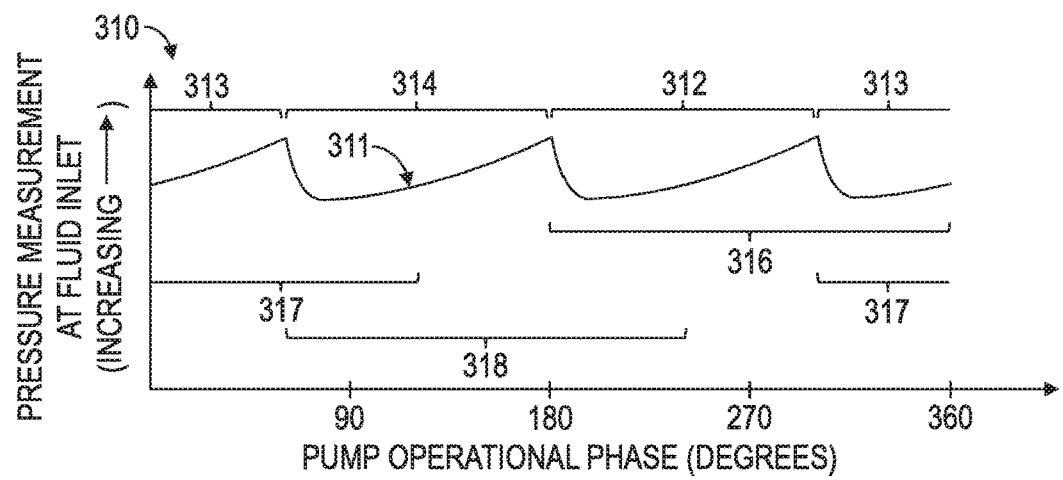

FIG. 6 is a graph 310 showing an example profile of a pressure measurements 311 of fluid (e.g., drilling fluid) at a fluid inlet (i.e., suction) of an operationally healthy fluid pump, such as the pump associated with FIG. 5. The pressure measurements 311 are shown plotted along the vertical axis, with respect to pump phase (e.g., pump cycle position, crankshaft position, fluid displacing member position), which is shown plotted along the horizontal axis. The pressure measurements 311 are associated with a fluid inlet of a triplex reciprocating pump (e.g., pump 201 shown in FIGS. 2 and 3) having three fluid displacing members reciprocating within corresponding fluid pressurizing chambers at 120 degrees out of phase. The pressure measurements 311 may be facilitated by pressure sensors (e.g., pressure sensors 206 shown in FIGS. 2 and 3) associated with the pump and received by a processing device (e.g., processing device 204 shown in FIGS. 2 and 3). The phase of the pump may be determined by the processing device based on position sensor measurements facilitated by position sensors (e.g., position sensors 209, 211 shown in FIGS. 2 and 3) associated with the pump.

The graph 310 shows a first pressure drop 312 (e.g., dip, trough) being generated during phase period 316 (i.e., drawdown period) during which a first fluid displacing member decreases pressure within a first fluid pressurizing chamber causing a corresponding outlet (i.e., discharge) valve to close, a corresponding inlet (i.e., suction) valve to open, and the fluid to be drawn via (or from) a fluid inlet into the first fluid pressurizing chamber, thereby decreasing the pressure at the fluid inlet. The graph 310 further shows a second pressure drop 313 being generated during phase period 317 during which a second fluid displacing member decreases pressure within a second fluid pressurizing chamber causing a corresponding outlet valve to close, a corresponding inlet valve to open, and the fluid to be drawn via (or from) the fluid inlet into the second fluid pressurizing chamber, thereby decreasing the pressure at the fluid inlet. The graph 310 still further shows a third pressure drop 314 being generated during phase period 318, during which a third fluid displacing member decreases pressure within a third fluid pressurizing chamber causing a corresponding outlet valve to close, a corresponding inlet valve to open, and the fluid to be drawn via (or from) the fluid inlet into the first fluid pressurizing chamber, thereby decreasing the pressure at the fluid inlet.

As shown in graphs 300, 310, the fluid is discharged from and drawn into the corresponding fluid pressurizing chambers during phase periods 306, 307, 308 and phase periods 316, 317, 318, respectively, each of which lasts for about 180 degrees of the pump phase. As further shown in graphs 300, 310, there is overlap between phase periods 306, 307, 308 when each fluid pressurizing chamber discharges fluid and phase periods 316, 317, 318 when each fluid pressurizing chamber receives fluid. The phase periods 306, 307, 308 316, 317, 318 may be determined by the processing device based on position measurements of the fluid compressing member 222 facilitated by one or more of the position sensors 209, 211.

Figure 7:
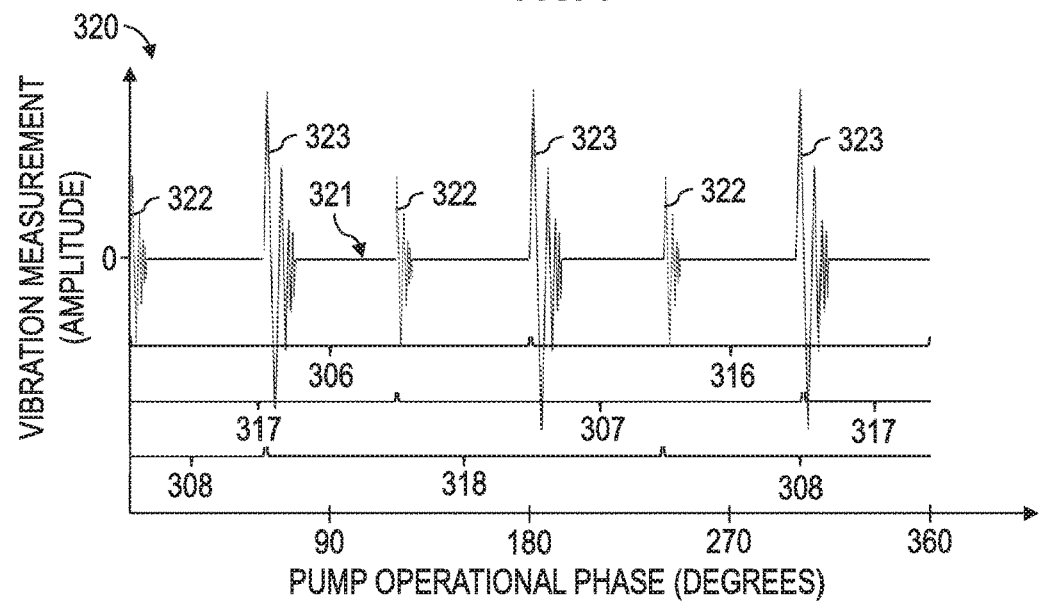
Figure 8:
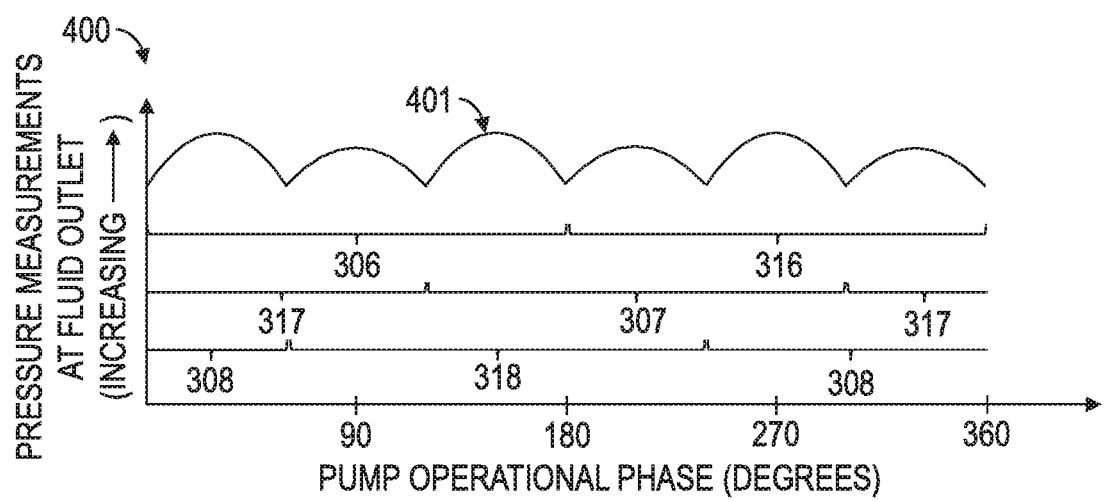
Figure 9:
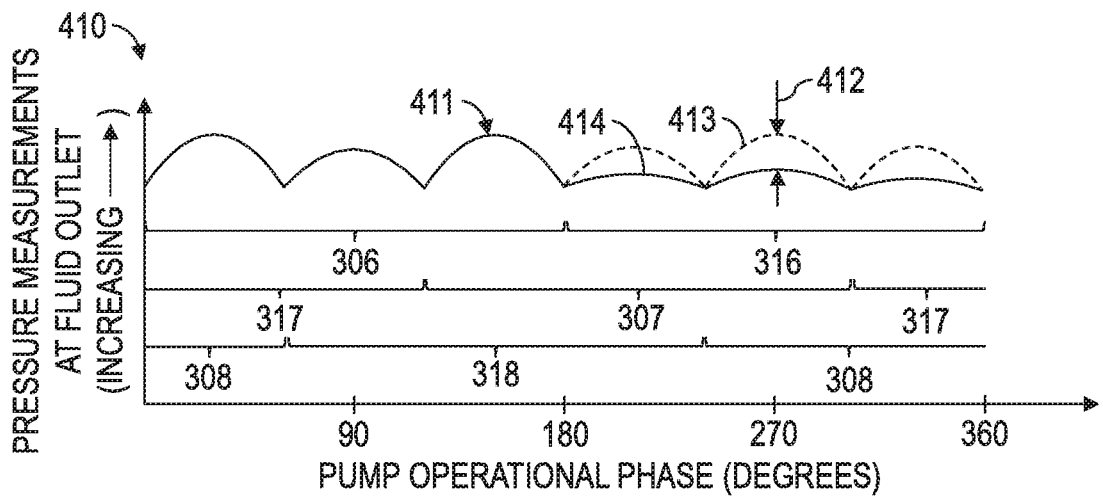
Figure 10:
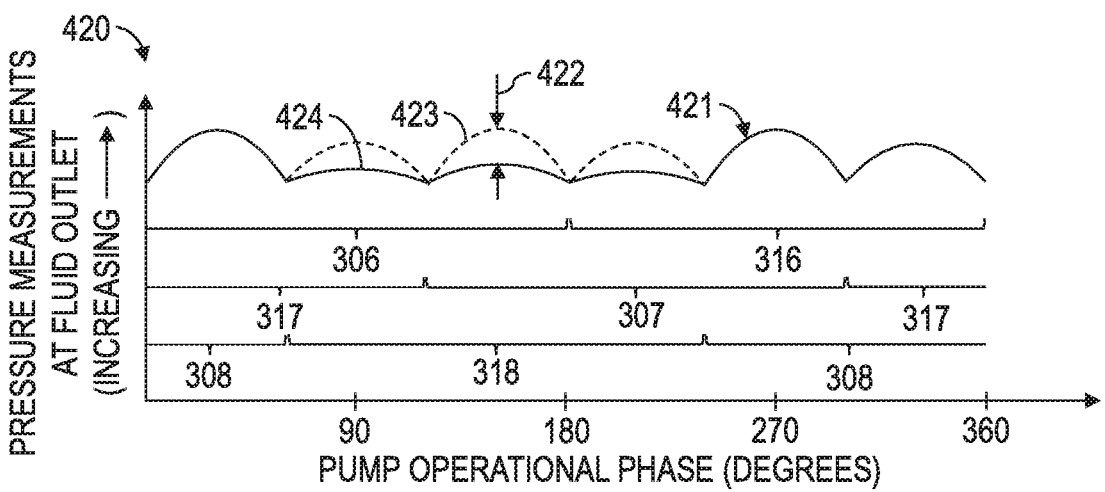
Figure 11:
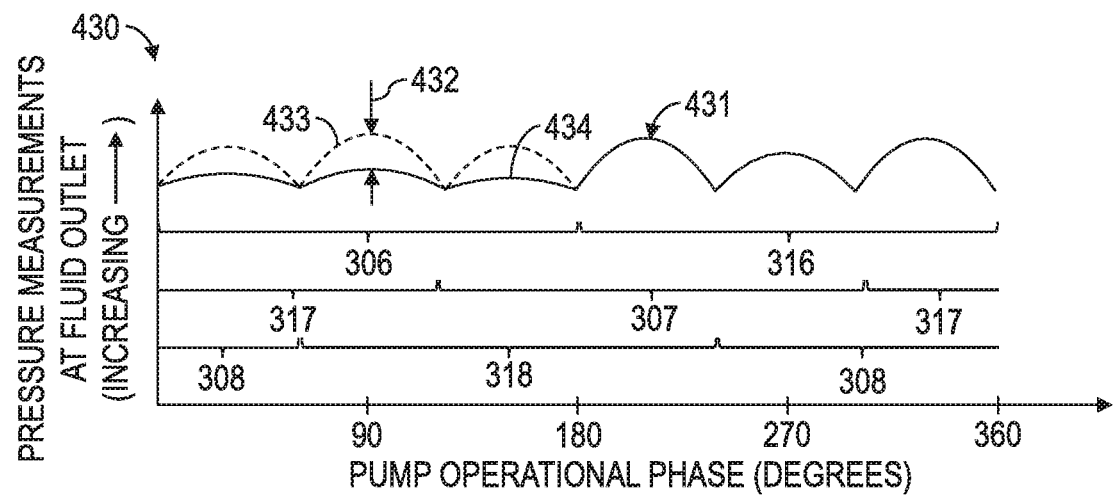
Figure 12:
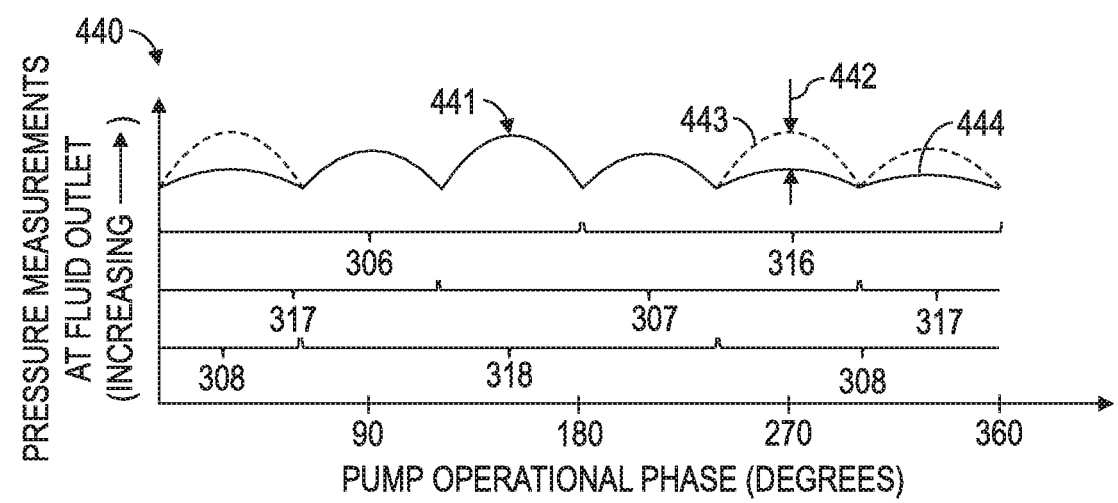
Figure 13:
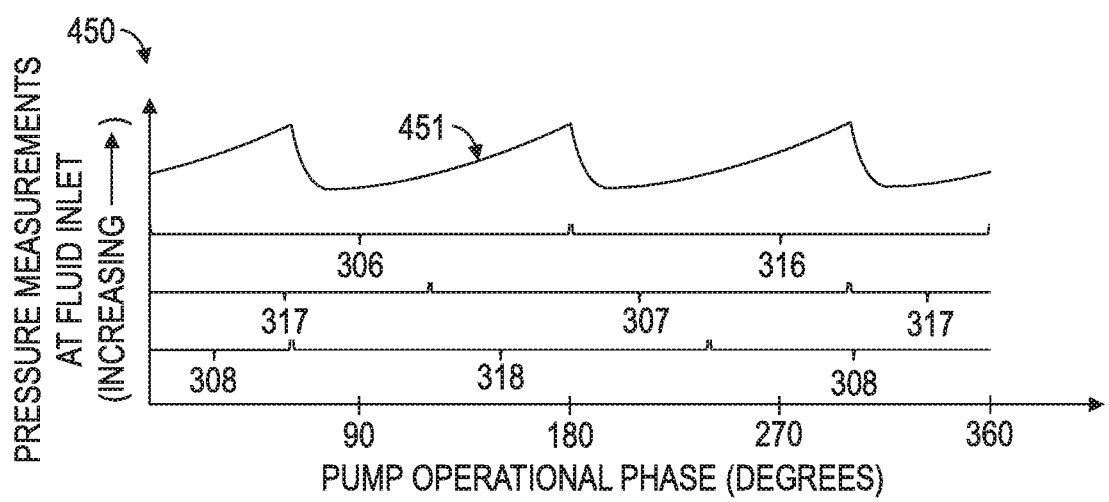
Figure 14:
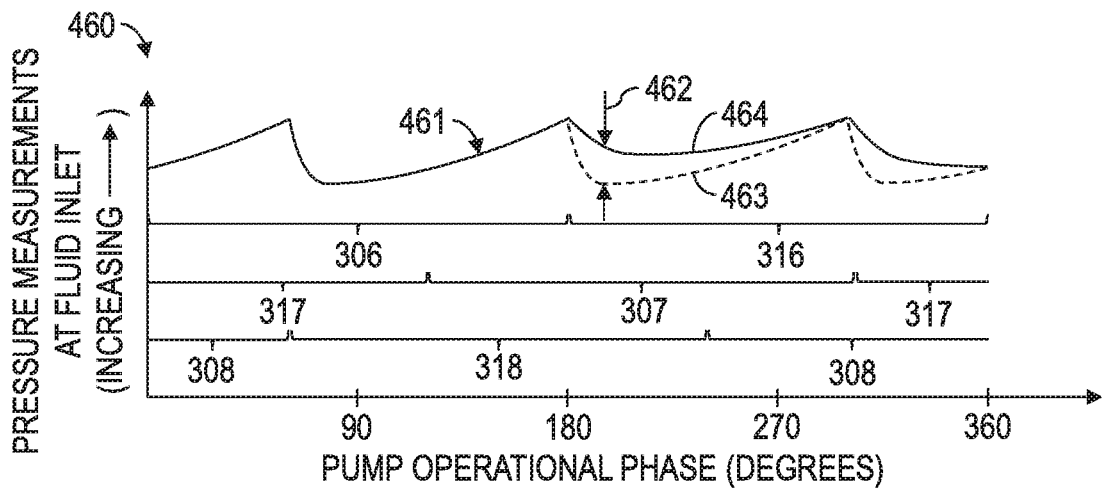
Figure 15:
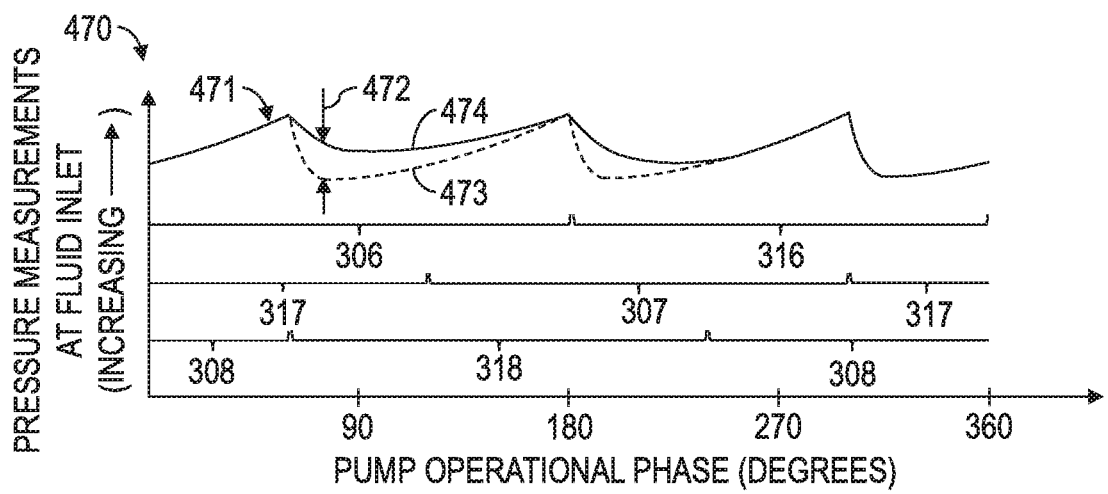
Figure 16:
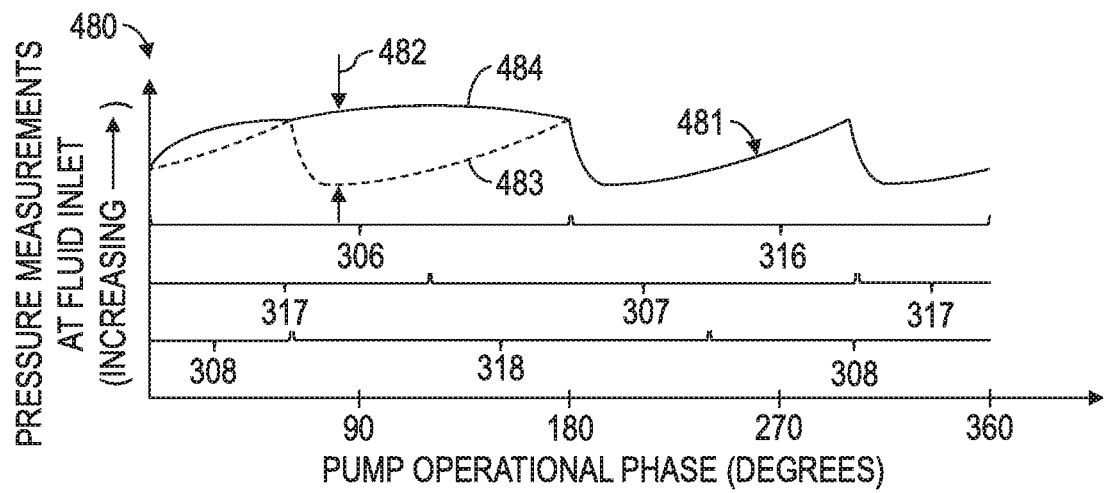
Figure 17:
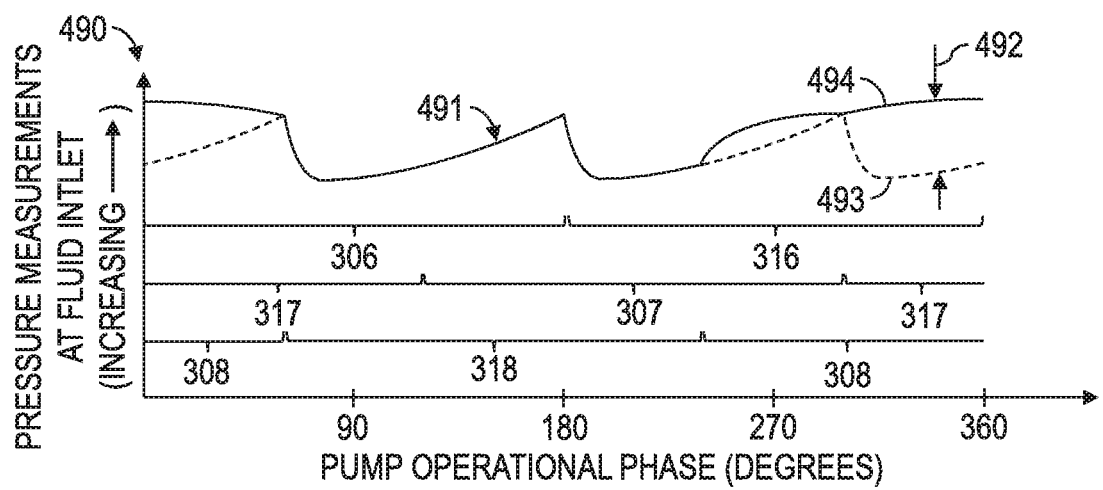

FIG. 7 is a graph 320 showing example amplitudes of vibration measurements 321 generated by closing of inlet (i.e., suction) and outlet (i.e., discharge) valves of a fluid pump, such as the pump associated with FIGS. 5 and 6. The vibration measurements 321 are shown plotted along the vertical axis, with respect to pump phase (e.g., pump cycle position, crankshaft position, fluid displacing member position), which is shown plotted along the horizontal axis. The vibration measurements 321 are associated with a fluid inlet of a triplex reciprocating pump (e.g., pump 201 shown in FIGS. 2 and 3) having three fluid displacing members reciprocating within corresponding fluid pressurizing chambers at 120 degrees out of phase. The vibration measurements 321 may be indicative of impacts generated by inlet and outlet valves (e.g., inlet and outlet valves 228, 236 shown in FIGS. 2 and 3) of the pump. The impacts may be generated, for example, when the inlet and outlet valves impact the housing of the pump when the inlet and outlet valves are forced closed by corresponding springs and/or pressure differential on opposing sides of each valve. The vibration measurements 321 may be facilitated by a vibration sensor (e.g., vibration sensor 207 shown in FIGS. 2 and 3) associated with the pump and received by a processing device (e.g., processing device 204).

The graph 320 shows a plurality of low amplitude vibrations 322 caused by closing of inlet valves, which are subject to low pressure differentials (e.g., about 5 PSI to about 250 PSI) between the fluid inlet and the corresponding pressure chambers at closure, thereby resulting in low magnitude impacts. The graph further 320 shows a plurality of high amplitude vibrations 323 caused by closing of outlet valves, which are subject to high pressure differentials (e.g., about 500 PSI to about 5,000 PSI or more) between the fluid outlet and the corresponding pressure chambers at closure, thereby resulting in high magnitude impacts. The timing of the vibrations 322, 323 may indicate the exact time when each inlet and outlet valve closes (and opens). Accordingly, the timing of the phase periods 306, 307, 308, 316, 317, 318 may be determined or confirmed by the processing device based on the vibration measurements 321 facilitated by the vibration sensor instead of or in addition to the position measurements of the fluid compressing members 222. Because certain fluids pumped by the fluid pump may be compressible, the exact time at which each inlet and outlet valve closes may not be accurately determined based solely on position measurements of the fluid displacing members within the corresponding fluid pressurizing chambers.

Each low and high amplitude vibration 322, 323 may be associated with a fluid displacing member and fluid pressurizing chamber by considering position measurements generated by the position sensors (e.g., position sensors 209, 211 shown in FIGS. 2 and 3) associated with the pump. For example, when the first fluid displacing member reaches end of pressurizing stroke within the first fluid pressurizing chamber, a position sensor associated with the first fluid pressurizing chamber will be triggered at about the same time (e.g., within a few degrees) that the first outlet valve of the first fluid pressurizing chamber closes, generating a high amplitude vibration 323. As described above, a fluid outlet valve closes when a fluid displacing member starts moving out of the corresponding fluid pressurizing chamber. Thus, the high amplitude vibration 323 may be associated with the first outlet valve closing. Accordingly, the timing of the high and low amplitude vibrations 322, 323 and the position measurements of the fluid displacing members may be analyzed by the processing device to define or confirm timing of the phase periods 306, 307, 308, during which the inlet valves are closed and outlet valves are open, and of the phase periods 316, 317, 318, during which the inlet valves are open and outlet valves are closed.

FIGS. 8-12 are graphs 400, 410, 420, 430, 440 showing example pressure measurements 401, 411, 421, 431, 441, respectively, of a fluid (e.g., drilling fluid) at a fluid outlet (e.g., outlet manifold, discharge manifold) of fluid pumps having different operational health. The pressure measurements 401, 411, 421, 431, 441 are shown plotted along the vertical axis, with respect to pump phase (e.g., pump cycle position, crankshaft position, fluid displacing member position), which is shown plotted along the horizontal axis. Each of the pressure measurements 401, 411, 421, 431, 441 are associated with a triplex reciprocating pump (e.g., pump 201 shown in FIGS. 2 and 3) comprising three fluid displacing members reciprocating within corresponding fluid pressurizing chambers at 120 degrees out of phase, three inlet valves controlling flow of fluid into corresponding fluid pressurizing chambers from a fluid inlet, and three outlet valves controlling flow of fluid out of corresponding fluid pressurizing chambers into a fluid outlet. The pressure measurements 401, 411, 421, 431, 441 may be facilitated by a pressure sensor (e.g., pressure sensor 205 shown in FIGS. 2 and 3) disposed at the fluid outlet of the pump and received by a processing device (e.g., processing device 204 shown in FIGS. 2 and 3). The processing device may detect irregular pressure measurements 414, 424, 434, 444 of, within, or based on the pressure measurements 401, 411, 421, 431, 441. The pressure measurements 401, 411, 421, 431, 441 are shown with respect to the phase periods 306, 307, 308, 316, 317, 318, which may be determined by the processing device based on position sensor measurements facilitated by one or more position sensors (e.g., position sensors 209, 211 shown in FIGS. 2 and 3) and/or vibration measurements facilitated by a vibration sensor (e.g., vibration sensor 207 shown in FIGS. 2 and 3), as described above.

Graph 400 shows example pressure measurements 401 of a fluid at a fluid outlet of an operationally healthy fluid pump. The pressure measurements 401 comprise distinct peaks and magnitudes that are substantially uniform and/or as expected, and do not comprise irregular pressure measurements that are appreciably lower or higher than as expected. Expected pressure measurements may be referred to as baseline pressure measurements, which may be or comprise pressure measurements defined by operational specifications of the pump and/or pressure measurements of a fully functional or operationally healthy pump (e.g., a new pump, a newly repaired pump).

Graph 410 shows example pressure measurements 411 of a fluid at a fluid outlet of at least a partially operationally unhealthy fluid pump. The pressure measurements 411 comprise irregular or unexpected pressure measurements in the form of lower amplitude pressure measurements 414 (e.g., lower pressure peaks) at (or within) the fluid outlet, which may be indicative of one or more leaking inlet and/or outlet valves. Valve leakage may be caused by wear and/or degradation of sealing material of a moving portion of the valve (e.g., the valve 236) and/or a valve seat (e.g., portions of the fluid end module 216 defining the cavity 234) against which the moving portion seals. The degree, amount, or magnitude by which the lower amplitude pressure measurements 414 differ 412 from expected baseline pressure measurements 413 may be indicative of the level (e.g., amount, degree, severity) of fluid leakage across the valve and, thus, indicative of the level of wear and/or degradation sustained by the valve. A small pressure measurement differential 412 may be indicative of a small level of wear and/or degradation and a large pressure measurement differential 412 may be indicative of a large level of wear and/or degradation. The level of wear and/or degradation of the valve may be monitored over time by recording and/or comparing the pressure differences 412 to the baseline pressure measurements 413 over time. Valve leakage may also or instead be caused by debris being stuck between the moving portion of the valve and the valve seat, preventing the moving portion of the valve to seal against the valve seat. Valve leakage may also or instead be caused by improper operations of the valve, whereby the moving portion of the valve does not align properly with the valve seat, preventing the moving portion of the valve to seal against the valve seat. Such improper operation may be caused by improper installation of the moving portion of the valve.

An operationally unhealthy valve of a pump may be distinguished, identified, or otherwise determined based on the pump phase (i.e., which of the fluid inlet and outlet valves of the pump is closed and which of the fluid inlet and outlet valves of the pump is open) during which the irregular and/or unexpected pressure measurements (e.g., the lower amplitude pressure measurements 414) taken at the fluid outlet of the pump start, end, and/or otherwise occur. For example, as shown in graph 410, the lower amplitude pressure measurements 414 start at about the same time as phase period 316 and coincide with the entire phase period 316, during which the first outlet valve corresponding to the first fluid pressurizing chamber is closed and the first inlet valve is open. Furthermore, the graph 410 shows that the first outlet valve opens at about the same time the lower amplitude pressure measurements 414 stop (i.e., end). Because a leaking valve effects operation (i.e., pressure measurements) of a pump when the valve is closed and not when the valve is open, the leaking valve is determined to be the first outlet valve corresponding to the first fluid pressurizing chamber. Also, just the phase period 316 coincides entirely with the lower amplitude pressure measurements 414, meaning that just the first outlet valve corresponding to the first fluid pressurizing chamber is leaking. Although the lower amplitude pressure measurements 414 partially coincide (i.e., overlap) by about 60 degrees with phase periods 317, 318 during which time the corresponding outlet valves are closed, and by about 120 degrees with phase periods 307, 308 during which time the corresponding inlet valves are closed, the pressure measurements 411 during the non-coinciding portions of the phase periods 307, 308, 317, 318 are as expected (e.g., substantially equal to baseline pressure measurements 413, appreciably higher than the lower amplitude pressure measurements 414), which is indicative that the inlet and outlet valves associated with the phase periods 307, 308, 317, 318 are operationally healthy while closed. Thus, the first outlet valve corresponding to the first fluid pressurizing chamber is determined to be the leaking valve because the lower amplitude pressure measurements 414 start at about the same time as the phase period 316 starts, stop at about the same time as the phase period 316 stops, and/or coincide or overlap with substantially the entire phase period 316 during which the first outlet valve is closed.

Graph 420 shows example pressure measurements 421 of a fluid at a fluid outlet of at least a partially operationally unhealthy fluid pump. The pressure measurements 421 comprise irregular or unexpected pressure measurements in the form of lower amplitude pressure measurements 424 (e.g., lower pressure peaks) at (or within) the fluid outlet, which may be indicative of one or more leaking inlet and/or outlet valves. The degree, amount, or magnitude by which the lower amplitude pressure measurements 424 differ 422 from expected baseline pressure measurements 423 may be indicative of the level (e.g., amount, degree, severity) of fluid leakage across the valve and, thus, indicative of the level of wear and/or degradation sustained by the valve. The level of wear and/or degradation of the valve may be monitored over time by recording and/or comparing the pressure differences 422 to the baseline pressure measurements 423 over time.

As shown in graph 420, the lower amplitude pressure measurements 424 start at about the same time as phase period 318 and coincide with the entire phase period 318, during which the third outlet valve corresponding to the third fluid pressurizing chamber is closed and the third inlet valve is open. Furthermore, the graph 420 shows that the third outlet valve opens at about the same time the lower amplitude pressure measurements 424 stop. Thus, the leaking valve is determined to be the third outlet valve corresponding to the third fluid pressurizing chamber. Also, just the phase period 318 coincides entirely with the lower amplitude pressure measurements 424, meaning that just the third outlet valve corresponding to the third fluid pressurizing chamber is leaking. Although the lower amplitude pressure measurements 424 partially coincide (i.e., overlap) by about 60 degrees with phase periods 316, 317 during which time the corresponding outlet valves are closed, and by about 120 degrees with phase periods 306, 307 during which time the corresponding inlet valves are closed, the pressure measurements 421 during the non-coinciding portions of the phase periods 306, 307, 316, 317 are as expected (e.g., substantially equal to baseline pressure measurements 423, appreciably higher than the lower amplitude pressure measurements 424), which is indicative that the inlet and outlet valves associated with the phase periods 306, 307, 316, 317 are operationally healthy while closed. Thus, the third outlet valve corresponding to the third fluid pressurizing chamber is determined to be the leaking valve because the lower amplitude pressure measurements 424 start at about the same time as the phase period 318 starts, stop at about the same time as the phase period 318 stops, and/or coincide or overlap with substantially the entire phase period 318 during which the third outlet valve is closed.

Graph 430 shows example pressure measurements 431 of a fluid at a fluid outlet of at least a partially operationally unhealthy fluid pump. The pressure measurements 431 comprise irregular or unexpected pressure measurements in the form of lower amplitude pressure measurements 434 (e.g., lower pressure peaks) at (or within) the fluid outlet, which may be indicative of one or more leaking inlet and/or outlet valves. The degree, amount, or magnitude by which the lower amplitude pressure measurements 434 differ 432 from expected baseline pressure measurements 433 may be indicative of the level (e.g., amount, degree, severity) of fluid leakage across the valve and, thus, indicative of the level of wear and/or degradation sustained by the valve. The level of wear and/or degradation of the valve may be monitored over time by recording and/or comparing the pressure differences 432 to the baseline pressure measurements 433 over time.

As shown in graph 430, the lower amplitude pressure measurements 434 start at about the same time as phase period 306 and coincide with the entire phase period 306, during which the first inlet valve corresponding to the first fluid pressurizing chamber is closed and the first outlet valve is open. Furthermore, the graph 430 shows that the first inlet valve opens at about the same time the lower amplitude pressure measurements 434 stop. Thus, the leaking valve is determined to be the first inlet valve corresponding to the first fluid pressurizing chamber. Also, just the phase period 306 coincides entirely with the lower amplitude pressure measurements 434, meaning that just the first inlet valve corresponding to the first fluid pressurizing chamber is leaking. Although the lower amplitude pressure measurements 434 partially coincide (i.e., overlap) by about 60 degrees with phase periods 307, 308 during which time the corresponding inlet valves are closed, and by about 120 degrees with phase periods 317, 318 during which time the corresponding outlet valves are closed, the pressure measurements 431 during the non-coinciding portions of the phase periods 307, 308, 317, 318 are as expected (e.g., substantially equal to baseline pressure measurements 433, appreciably higher than the lower amplitude pressure measurements 434), which is indicative that the outlet and inlet valves associated with the phase periods 307, 308, 317, 318 are operationally healthy while closed. Thus, the first inlet valve corresponding to the first fluid pressurizing chamber is determined to be the leaking valve because the lower amplitude pressure measurements 434 start at about the same time as the phase period 306 starts, stop at about the same time as the phase period 306 stops, and/or coincide or overlap with substantially the entire phase period 306 during which the first inlet valve is closed.

Graph 440 shows example pressure measurements 441 of a fluid at a fluid outlet of at least a partially operationally unhealthy fluid pump. The pressure measurements 441 comprise irregular or unexpected pressure measurements in the form of lower amplitude pressure measurements 444 (e.g., lower pressure peaks) at (or within) the fluid outlet, which may be indicative of one or more leaking inlet and/or outlet valves. The degree, amount, or magnitude by which the lower amplitude pressure measurements 444 differ 442 from expected baseline pressure measurements 443 may be indicative of the level (e.g., amount, degree, severity) of fluid leakage across the valve and, thus, indicative of the level of wear and/or degradation sustained by the valve. The level of wear and/or degradation of the valve may be monitored over time by recording and/or comparing the pressure differences 442 to the baseline pressure measurements 443 over time.

As shown in graph 440, the lower amplitude pressure measurements 444 start at about the same time as phase period 308 and coincide with the entire phase period 308, during which the third inlet valve corresponding to the third fluid pressurizing chamber is closed and the third outlet valve is open. Furthermore, the graph 440 shows that the third inlet valve opens at about the same time the lower amplitude pressure measurements 444 stop. Thus, the leaking valve is determined to be the third inlet valve corresponding to the third fluid pressurizing chamber. Also, just the phase period 308 coincides entirely with the lower amplitude pressure measurements 444, meaning that just the third inlet valve corresponding to the third fluid pressurizing chamber is leaking. Although the lower amplitude pressure measurements 444 partially coincide (i.e., overlap) by about 60 degrees with phase periods 306, 307 during which time the corresponding inlet valves are closed, and by about 120 degrees with phase periods 316, 317 during which time the corresponding outlet valves are closed, the pressure measurements 441 during the non-coinciding portions of the phase periods 306, 307, 316, 317 are as expected (e.g., substantially equal to baseline pressure measurements 443, appreciably higher than the lower amplitude pressure measurements 444), which is indicative that the outlet and inlet valves associated with the phase periods 306, 307, 316, 317 are operationally healthy while closed. Thus, the third inlet valve corresponding to the third fluid pressurizing chamber is determined to be the leaking valve because the lower amplitude pressure measurements 444 start at about the same time as the phase period 308 starts, stop at about the same time as the phase period 308 stops, and/or coincide or overlap with substantially the entire phase period 308 during which the third inlet valve is closed.

FIGS. 13-17 are graphs 450, 460, 470, 480, 490 showing example pressure measurements 451, 461, 471, 481, 491, respectively, of a fluid (e.g., drilling fluid) at a fluid inlet (e.g., inlet manifold, suction manifold) of fluid pumps having different operational health. The pressure measurements 451, 461, 471, 481, 491 are shown plotted along the vertical axis, with respect to pump phase (e.g., pump cycle position, crankshaft position, fluid displacing member position), which is shown plotted along the horizontal axis. Each of the pressure measurements 451, 461, 471, 481, 491 are associated with a triplex reciprocating pump (e.g., pump 201 shown in FIGS. 2 and 3) comprising three fluid displacing members reciprocating within corresponding fluid pressurizing chambers at 120 degrees out of phase, three inlet valves controlling flow into corresponding fluid pressurizing chambers from a fluid inlet, and three outlet valves controlling flow out of corresponding fluid pressurizing chambers into a fluid outlet. The pressure measurements 451, 461, 471, 481, 491 may be facilitated by a pressure sensor (e.g., pressure sensor 206 shown in FIGS. 2 and 3 shown in FIGS. 2 and 3) disposed at the fluid inlet of the pump and received by a processing device (e.g., processing device 204). The processing device may detect irregular pressure measurements 454, 464, 474, 484 of, within, or based on the pressure measurements 451, 461, 471, 481, 491. The pressure measurements 451, 461, 471, 481, 491 are shown with respect to the phase periods 306, 307, 308, 316, 317, 318, which may be determined by the processing device based on position sensor measurements facilitated by one or more position sensors (e.g., position sensors 209, 211 shown in FIGS. 2 and 3) and/or vibration measurements facilitated by a vibration sensor (e.g., vibration sensor 207 shown in FIGS. 2 and 3), as described above.

Graph 450 shows example pressure measurements 451 of a fluid at a fluid inlet of an operationally healthy fluid pump. The pressure measurements 451 comprise distinct pressure drops and magnitudes that are substantially uniform and/or as expected, and do not comprise irregular pressure measurements that are appreciably lower or higher than as expected. Expected pressure measurements may be referred to as baseline pressure measurements, which may be or comprise pressure measurements defined by operational specifications of the pump and/or pressure measurements of a fully functional or operationally healthy pump (e.g., a new pump, a newly repaired pump).

Graph 460 shows example pressure measurements 461 of a fluid at a fluid inlet of at least a partially operationally unhealthy fluid pump. The pressure measurements 461 comprise irregular or unexpected pressure measurements in the form of higher amplitude pressure measurements 464 (e.g., smaller pressure drops) at (or within) the fluid inlet, which may be indicative of one or more leaking inlet and/or outlet valves. Inlet and outlet valves may experience wear and/or degradation of sealing material of the moving portion of the valve and/or of the valve seats against which the moving portion seals. Valve leakage may be caused by wear and/or degradation of sealing material of a moving portion of the valve (e.g., the valve 228) and/or a valve seat (e.g., portions of the fluid end module 216 defining the cavity 224) against which the moving portion seals. The degree, amount, or magnitude by which the higher amplitude pressure measurements 464 differ 462 from expected baseline pressure measurements 463 may be indicative of the level (e.g., amount, degree, severity) of fluid leakage across the valve and, thus, indicative of the level of wear and/or degradation sustained by the valve. A small pressure measurement differential 462 may be indicative of a small level of wear and/or degradation and a large pressure measurement differential 462 may be indicative of a large level of wear and/or degradation. The level of wear and/or degradation of the valve may be monitored over time by recording and/or comparing the pressure differences 462 to the baseline pressure measurements 463 over time. Valve leakage may also or instead be caused by debris being stuck between the moving portion of the valve and the valve seat, preventing the moving portion of the valve to seal against the valve seat. Valve leakage may also or instead be caused by improper operations of the valve, whereby the moving portion of the valve does not align properly with the valve seat, preventing the moving portion of the valve to seal against the valve seat. Such improper operation may be caused by improper installation of the moving portion of the valve.

An operationally unhealthy valve of a pump may be distinguished, identified, or otherwise determined based on the pump phase (i.e., which of the fluid inlet and outlet valves of the pump is closed and which of the fluid inlet and outlet valves of the pump is open) during which the irregular and/or unexpected pressure measurements (e.g., the higher amplitude pressure measurements 464) taken at the fluid inlet of the pump start, stop, and/or otherwise occur. For example, as shown in graph 460, the higher amplitude pressure measurements 464 start at about the same time as phase period 316 and coincide with the entire phase period 316, during which the first fluid pressurizing chamber is closed and the first inlet valve is open. Furthermore, the graph 460 shows that the first outlet valve opens at about the same time the higher amplitude pressure measurements 464 stop. Because a leaking valve effects operation (i.e., pressure measurements) of a pump when the valve is closed and not when the valve is open, the leaking valve is determined to be the first outlet valve corresponding to the first fluid pressurizing chamber. Also, just the phase period 316 coincides entirely with the higher amplitude pressure measurements 464, meaning that just the first outlet valve corresponding to the first fluid pressurizing chamber is leaking. Although the higher amplitude pressure measurements 464 partially coincide (i.e., overlap) by about 60 degrees with phase periods 317, 318 during which time the corresponding outlet valves are closed, and by about 120 degrees with phase periods 307, 308 during which time the corresponding inlet valves are closed, the pressure measurements 461 during the non-coinciding portions of the phase periods 307, 308, 317, 318 are as expected (e.g., substantially equal to baseline pressure measurements 463, appreciably lower than the higher amplitude pressure measurements 464), which is indicative that the inlet and outlet valves associated with the phase periods 307, 308, 317, 318 are operationally healthy while closed. Thus, the first outlet valve corresponding to the first fluid pressurizing chamber is determined to be the leaking valve because the higher amplitude pressure measurements 464 start at about the same time as the phase period 316 starts, stop at about the same time as the phase period 316 stops, and/or coincide or overlap with substantially the entire phase period 316 during which the first outlet valve is closed.

Graph 470 shows example pressure measurements 471 of a fluid at a fluid inlet of at least a partially operationally unhealthy fluid pump. The pressure measurements 471 comprise irregular or unexpected pressure measurements in the form of higher amplitude pressure measurements 474 (e.g., smaller pressure drops) at (or within) the fluid inlet, which may be indicative of one or more leaking inlet and/or outlet valves. The degree, amount, or magnitude by which the higher amplitude pressure measurements 474 differ 472 from expected baseline pressure measurements 473 may be indicative of the level (e.g., amount, degree, severity) of fluid leakage across the valve and, thus, indicative of the level of wear and/or degradation sustained by the valve. The level of wear and/or degradation of the valve may be monitored over time by recording and/or comparing the pressure differences 472 to the baseline pressure measurements 473 over time.

As shown in graph 470, the higher amplitude pressure measurements 474 start at about the same time as phase period 318 and coincide with the entire phase period 318, during which the third outlet valve corresponding to the third fluid pressurizing chamber is closed and the third inlet valve is open. Furthermore, the graph 470 shows that the third outlet valve opens at about the same time the higher amplitude pressure measurements 474 stop. Thus, the leaking valve is determined to be the third outlet valve corresponding to the third fluid pressurizing chamber. Also, just the phase period 318 coincides entirely with the higher amplitude pressure measurements 474, meaning that just the third outlet valve corresponding to the third fluid pressurizing chamber is leaking. Although the higher amplitude pressure measurements 474 partially coincide (i.e., overlap) by about 60 degrees with phase periods 316, 317 during which time the corresponding outlet valves are closed, and by about 120 degrees with phase periods 306, 307 during which time the corresponding inlet valves are closed, the pressure measurements 471 during the non-coinciding portions of the phase periods 306, 307, 316, 317 are as expected (e.g., substantially equal to baseline pressure measurements 473, appreciably lower than the higher amplitude pressure measurements 474), which is indicative that the inlet and outlet valves associated with the phase periods 306, 307, 316, 317 are operationally healthy while closed. Thus, the third outlet valve corresponding to the third fluid pressurizing chamber is determined to be the leaking valve because the higher amplitude pressure measurements 474 start at about the same time as the phase period 318 starts, stop at about the same time as the phase period 318 stops, and/or coincide or overlap with substantially the entire phase period 318 during which the third outlet valve is closed.

Graph 480 shows example pressure measurements 481 of a fluid at a fluid inlet of at least a partially operationally unhealthy fluid pump. The pressure measurements 481 comprise irregular or unexpected pressure measurements in the form of higher amplitude pressure measurements 484 (e.g., pressure increases) at (or within) the fluid inlet, which may be indicative of one or more leaking inlet and/or outlet valves. The degree, amount, or magnitude by which the higher amplitude pressure measurements 484 differ 482 from expected baseline pressure measurements 483 may be indicative of the level (e.g., amount, degree, severity) of fluid leakage across the valve and, thus, indicative of the level of wear and/or degradation sustained by the valve. The level of wear and/or degradation of the valve may be monitored over time by recording and/or comparing the pressure differences 482 to the baseline pressure measurements 483 over time.

As shown in graph 480, the higher amplitude pressure measurements 484 start at about the same time as phase period 306 and coincide with the entire phase period 306, during which the first inlet valve corresponding to the first fluid pressurizing chamber is closed and the first outlet valve is open. Furthermore, the graph 480 shows that the first inlet valve opens at about the same time the higher amplitude pressure measurements 484 stop. Thus, the leaking valve is determined to be the first inlet valve corresponding to the first fluid pressurizing chamber. Also, just the phase period 306 coincides entirely with the higher amplitude pressure measurements 484, meaning that just the first inlet valve corresponding to the first fluid pressurizing chamber is leaking. Although the higher amplitude pressure measurements 484 partially coincide (i.e., overlap) by about 60 degrees with phase periods 307, 308 during which time the corresponding inlet valves are closed, and by about 120 degrees with phase periods 317, 318 during which time the corresponding outlet valves are closed, the pressure measurements 481 during the non-coinciding portions of the phase periods 307, 308, 317, 318 are as expected (e.g., substantially equal to baseline pressure measurements 483, appreciably lower than the higher amplitude pressure measurements 484), which is indicative that the outlet and inlet valves associated with the phase periods 307, 308, 317, 318 are operationally healthy while closed. Thus, the first inlet valve corresponding to the first fluid pressurizing chamber is determined to be the leaking valve because the higher amplitude pressure measurements 484 start at about the same time as the phase period 306 starts, stop at about the same time as the phase period 306 stops, and/or coincide or overlap with substantially the entire phase period 306 during which the first inlet valve is closed.

Graph 490 shows example pressure measurements 491 of a fluid at a fluid inlet of at least a partially operationally unhealthy fluid pump. The pressure measurements 491 comprise irregular or unexpected pressure measurements in the form of higher amplitude pressure measurements 494 (e.g., pressure increases) at (or within) the fluid inlet, which may be indicative of one or more leaking inlet and/or outlet valves. The degree, amount, or magnitude by which the higher amplitude pressure measurements 494 differ 492 from expected baseline pressure measurements 493 may be indicative of the level (e.g., amount, degree, severity) of fluid leakage across the valve and, thus, indicative of the level of wear and/or degradation sustained by the valve. The level of wear and/or degradation of the valve may be monitored over time by recording and/or comparing the pressure differences 492 to the baseline pressure measurements 493 over time.

As shown in graph 490, the higher amplitude pressure measurements 494 start at about the same time as phase period 308 and coincide with the entire phase period 308, during which the third inlet valve corresponding to the third fluid pressurizing chamber is closed and the third outlet valve is open. Furthermore, the graph 490 shows that the third inlet valve opens at about the same time the higher amplitude pressure measurements 494 stop. Thus, the leaking valve is determined to be the third inlet valve corresponding to the third fluid pressurizing chamber. Also, just the phase period 308 coincides entirely with the higher amplitude pressure measurements 494, meaning that just the third inlet valve corresponding to the third fluid pressurizing chamber is leaking. Although the higher amplitude pressure measurements 494 partially coincide (i.e., overlap) by about 60 degrees with phase periods 306, 307 during which time the corresponding inlet valves are closed, and by about 120 degrees with phase periods 316, 317 during which time the corresponding outlet valves are closed, the pressure measurements 491 during the non-coinciding portions of the phase periods 306, 307, 316, 317 are as expected (e.g., substantially equal to baseline pressure measurements 493, appreciably lower than the higher amplitude pressure measurements 494), which is indicative that the outlet and inlet valves associated with the phase periods 306, 307, 316, 317 are operationally healthy while closed. Thus, the third inlet valve corresponding to the third fluid pressurizing chamber is determined to be the leaking valve because the higher amplitude pressure measurements 494 start at about the same time as the phase period 308 starts, stop at about the same time as the phase period 308 stops, and/or coincide or overlap with substantially the entire phase period 308 during which the third inlet valve is closed.

An operationally unhealthy valve of a pump may be distinguished, identified, or otherwise determined based on the pump phase (i.e., which of the fluid inlet and outlet valves of the pump is closed and which of the fluid inlet and outlet valves of the pump is open) during which the irregular and/or unexpected pressure measurements (e.g., lower amplitude pressure measurements, higher amplitude pressure measurements) start, end, and/or otherwise occur. The operationally unhealthy valve may be distinguished, identified, or otherwise determined based on pressure measurements taken at the fluid inlet, at the fluid outlet, or at both the fluid inlet and the fluid outlet.

Figure 18:
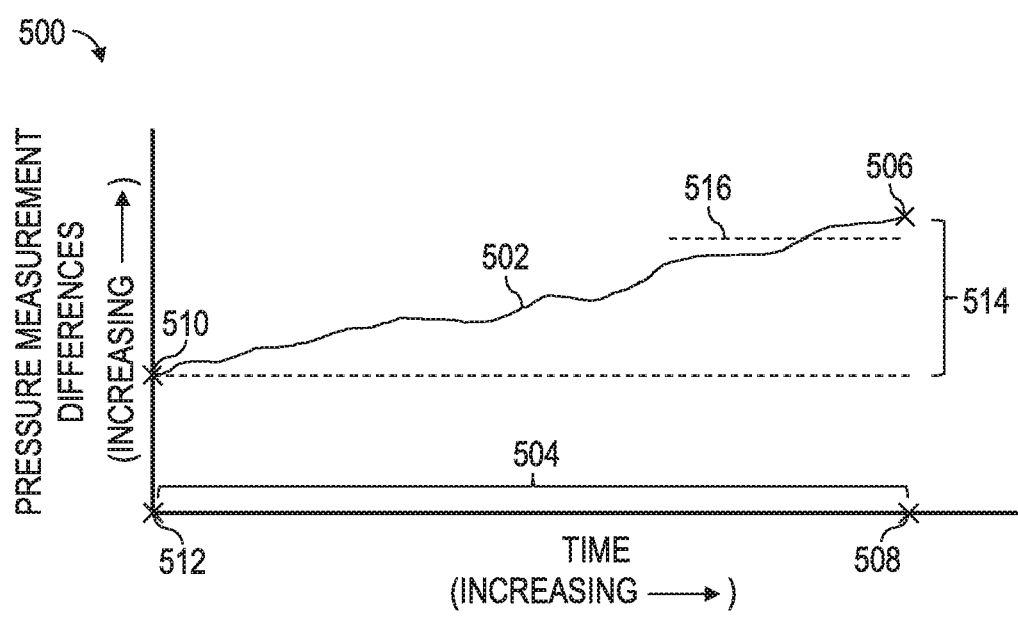

FIG. 18 is a graph 500 showing an example profile of recorded pressure measurement differences 514 between a baseline pressure measurement 510 and actual pressure measurements 502 taken at a fluid inlet of a pump and recorded over a period of time 504 by a processing device. The pressure measurements 502 are shown plotted along the vertical axis, with respect to time, which is shown plotted along the horizontal axis. The pressure measurements 502 may be recorded as part of or while the operational health monitoring operations described herein are performed. The operational health monitoring operations may be performed periodically (e.g., each day, each few days, each week, after each job, etc.) for a period of time 504 (e.g., a week, a month, a year, several wellsite jobs, etc.).

The processing device may periodically compare currently (or most recently) received and/or recorded pressure measurements to one or more previously recorded pressure measurements. For example, current pressure measurements 506 received and/or recorded by the processing device at a current (or most recent) time 508 may be compared to one or more previously recorded pressure measurements 502, such as baseline pressure measurements 510 (i.e., expected pressure measurements) that were set or recorded by the processing device at time 512. For example, the baseline pressure measurements 510 may be recorded at time 512 when the inlet and outlet valves of the pump were new or just repaired. Therefore, the baseline pressure measurements 510 may comprise pressure measurements associated with fully or otherwise optimally functional inlet and outlet valves. The processing device may then compare the current pressure measurements 506 to the baseline pressure measurements 510 to determine a difference 514 between the current pressure measurements 506 and the baseline pressure measurements 510. The determined difference 514 may be recorded to a database by the processing device. The processing device may then determine operational health of the inlet and outlet valves based on the comparison. The processing device may determine the difference 514 between the current pressure measurements 506 and the baseline pressure measurements 510 and the operational health of the inlet and outlet valves based on the difference 514 periodically (e.g., each time the operational health monitoring operations are performed). The determined pressure measurement differences 514 between the pressure measurements 502 and the baseline pressure measurements 510 may be or comprises the irregular pressure measurements 462, 472, 482, 492 described above.

For example, if the current pressure measurements 506 and the baseline pressure measurements 510 are substantially similar or match each other, then the inlet and outlet valves of the pump may be deemed or otherwise determined as being operationally healthy. However, if the current pressure measurements 506 and the baseline pressure measurements 510 are appreciably different, not substantially similar, or otherwise do not substantially match, then one or more of the inlet and outlet valves may be deemed or otherwise determined as being operationally unhealthy (e.g., degraded, worn, leaking, loose, inefficient, etc.). The inlet and outlet valves may be deemed or otherwise determined as being operationally unhealthy, for example, when the difference 514 (e.g., in profile and/or magnitude) between the current pressure measurements 506 and the baseline pressure measurements 510 is equal to or greater than a predetermined threshold amount 516 or is otherwise appreciable. If one or more of the inlet and outlet valves were deemed or otherwise determined as being operationally unhealthy, such inlet and outlet valves may then be replaced or repaired.

Although the pressure measurements 502 are shown increasing with respect to the baseline pressure measurements 510, it is to be understood that pressure measurements taken at a fluid outlet of the pump may decrease when one or more of the inlet and outlet valves of the pump are experiencing a decrease in operational health. Differences between such pressure measurements and the baseline pressure measurements 510 may be determined and analyzed in a similar manner as described above to determine the operational health of the inlet and outlet valves.

In view of the entirety of the present disclosure, including the figures and the claims, a person having ordinary skill in the art will readily recognize that the present disclosure introduces an apparatus comprising a system for monitoring operational health of a pump operable to pump a fluid at a wellsite, wherein the pump is or comprises a reciprocating pump, and wherein the system comprises: a pressure sensor disposed in association with the pump and operable to facilitate determination of pressure measurements of the fluid at a fluid inlet manifold and/or a fluid outlet manifold of the pump during pumping operations; a position sensor disposed in association with the pump and operable to facilitate determination of position measurements of fluid displacing members of the pump during pumping operations; and a processing device comprising a processor and memory storing computer program code, wherein the processing device is communicatively connected with the pressure sensor and the position sensor. The processing device is operable to: receive the pressure and position measurements; detect irregular pressure measurements based on the received pressure measurements; determine operational phase of the pump based on the received position measurements; and determine which of fluid inlet and outlet valves of the pump is leaking based on operational phase during which the irregular pressure measurements are detected.

Determining operational phase of the pump may comprise determining which of the fluid inlet and outlet valves of the pump is closed based on the position measurements, and determining which of the fluid inlet and outlet valves of the pump is leaking may comprise determining which of the fluid inlet and outlet valves is closed during the detected irregular pressure measurements. In such implementations, among others within the scope of the present disclosure, determining which of the fluid inlet and outlet valves of the pump is leaking may further comprise determining which of the fluid inlet and outlet valves is closed during an entirety of the detected irregular pressure measurements.

Determining operational phase of the pump may comprise determining which of the fluid inlet and outlet valves of the pump is closed based on the position measurements, and determining which of the fluid inlet and outlet valves of the pump is leaking may comprise determining which of the fluid inlet and outlet valves closes at about the same time the detected irregular pressure measurements start.

Irregular pressure measurements comprise pressure measurements that are lower or higher than the baseline pressure measurements.

The system may comprise a vibration sensor disposed in association with the pump and operable to facilitate determination of vibration measurements of impacts generated by the fluid inlet and outlet valves of the pump when closing. In such implementations, among others within the scope of the present disclosure, the processing device may be operable to receive the vibration measurements and determine operational phase of the pump based further on the vibration measurements, wherein the operational phase of the pump may be defined by which of the fluid inlet and outlet valves of the pump is closed.

The processing device may be operable to: compare the irregular pressure measurements to baseline pressure measurements to determine a difference between the irregular pressure measurements and the baseline pressure measurements; and determine leak severity of the leaking fluid inlet and outlet valves based on the difference. In such implementations, among others within the scope of the present disclosure, the processing device may be operable to determine that the leak severity of the leaking fluid inlet and outlet valves is low when the difference between the irregular pressure measurements and the baseline pressure measurements is less than a predetermined threshold quantity small. The processing device may be operable to determine that the leak severity of the leaking fluid inlet and outlet valves is high when the difference between the irregular pressure measurements and the baseline pressure measurements is equal to or greater than a predetermined threshold quantity.

The pump may be or comprise a drilling mud pump.

The pump may comprise a plurality of chambers, each chamber may be associated with a fluid displacing member, each fluid displacing member may be operable to reciprocate with respect to the chamber to alternatingly cause the chamber to receive the fluid via the fluid inlet manifold and discharge the fluid via the fluid outlet manifold, a corresponding instance of the fluid inlet valves may permit the fluid to flow into and prevent the fluid from flowing out of each chamber, and a corresponding instance of the fluid outlet valves may permit the fluid to flow out of and prevent the fluid from flowing into each chamber.

One or more of the fluid inlet and outlet valves of the pump may be leaking because of: wear of the one or more of the fluid inlet and outlet valves; debris stuck in the one or more of the fluid inlet and outlet valves; or improper seating of the one or more of the fluid inlet and outlet valves.

The present disclosure also introduces a method comprising commencing operation of a processing device to monitor operational health of a pump for pumping a fluid at a wellsite, wherein the pump is a reciprocating pump, and wherein, during pumping operations of the pump, the processing device: receives pressure measurements of the fluid at a fluid inlet manifold and/or a fluid outlet manifold of the pump; receives position measurements of fluid displacing members of the pump; detects irregular pressure measurements based on the received pressure measurements; determines operational phase of the pump based on the received position measurements; and determines which of fluid inlet and outlet valves of the pump is leaking based on operational phase during which the irregular pressure measurements are detected.

Determining the operational phase of the pump may comprise determining which of the fluid inlet and outlet valves of the pump is closed based on the position measurements, and determining which of the fluid inlet and outlet valves of the pump is leaking may comprise determining which of the fluid inlet and outlet valves is closed during the detected irregular pressure measurements. In such implementations, among others within the scope of the present disclosure, determining which of the fluid inlet and outlet valves of the pump is leaking may further comprise determining which of the fluid inlet and outlet valves is closed during an entirety of the detected irregular pressure measurements.

Determining the operational phase of the pump may comprise determining which of the fluid inlet and outlet valves of the pump is closed based on the position measurements, and determining which of the fluid inlet and outlet valves of the pump is leaking may comprise determining which of the fluid inlet and outlet valves closes at about the same time the detected irregular pressure measurements start.

Determining the operational phase of the pump may comprise determining which of the fluid inlet and outlet valves of the pump is closed based on the position measurements, and determining which of the fluid inlet and outlet valves is closed during the detected irregular pressure measurements may comprise determining which of the fluid inlet and outlet valves: closes at about the same time the detected irregular pressure measurements start; and opens at about the same time the detected irregular pressure measurements stop.

The irregular pressure measurements may comprise pressure measurements that are: lower than baseline pressure measurements; or higher than the baseline pressure measurements.

The processing device may: receive vibration measurements of impacts generated by fluid inlet and outlet valves of the pump when closing; and determine operational phase of the pump further based on the vibration measurements, wherein the operational phase of the pump may be defined by which of the fluid inlet and outlet valves of the pump is closed.

The processing device may: compare the irregular pressure measurements to baseline pressure measurements to determine a difference between the irregular pressure measurements and the baseline pressure measurements; and determine leak severity of the leaking fluid inlet and outlet valves based on the difference. In such implementations, among others within the scope of the present disclosure, the processing device may determine that the leak severity of the leaking fluid inlet and outlet valves is low when the difference between the irregular pressure measurements and the baseline pressure measurements is less than a predetermined threshold quantity. The processing device may determine that the leak severity of the leaking fluid inlet and outlet valves is high when the difference between the irregular pressure measurements and the baseline pressure measurements is equal to or greater than a predetermined threshold quantity.

The pump may be or comprise a drilling mud pump.

The pump may comprise a plurality of chambers, each chamber may be associated with a fluid displacing member, each fluid displacing member may be operable to reciprocate with respect to the chamber to alternatingly cause the chamber to receive the fluid via the fluid inlet manifold and discharge the fluid via the fluid outlet manifold, a corresponding instance of the fluid inlet valves may permit the fluid to flow into and prevent the fluid from flowing out of each chamber, and a corresponding instance of the fluid outlet valves may permit the fluid to flow out of and prevent the fluid from flowing into each chamber.

The present disclosure also introduces a method comprising commencing operation of a processing device to monitor operational health of a pump for pumping a fluid at a wellsite, wherein the pump is a reciprocating pump, and wherein, during pumping operations of the pump, the processing device: receives pressure measurements of the fluid at a fluid inlet manifold and/or a fluid outlet manifold of the pump; receives vibration measurements of impacts generated by fluid inlet and outlet valves of the pump when closing; detects irregular pressure measurements based on the received pressure measurements; determines operational phase of the pump based on the received vibration measurements, wherein the operational phase of the pump is defined by which of the fluid inlet and outlet valves of the pump is closed; and determines which of fluid inlet and outlet valves of the pump is leaking based on operational phase during which the irregular pressure measurements are detected.

Determining which of the fluid inlet and outlet valves of the pump is leaking may comprise determining which of the fluid inlet and outlet valves is closed during the detected irregular pressure measurements.

Determining which of the fluid inlet and outlet valves of the pump is leaking may comprise determining which of the fluid inlet and outlet valves closes at about the same time the detected irregular pressure measurements start.

Determining which of the fluid inlet and outlet valves of the pump is leaking may comprise determining which of the fluid inlet and outlet valves: closes at about the same time the detected irregular pressure measurements start; and opens at about the same time the detected irregular pressure measurements stop.

The irregular pressure measurements may comprise pressure measurements that are: lower than baseline pressure measurements; or higher than the baseline pressure measurements.

The processing device may: receive position measurements of fluid displacing members of the pump; and determine operational phase of the pump based further on the position measurements.

The processing device may: compare the irregular pressure measurements to baseline pressure measurements to determine a difference between the irregular pressure measurements and the baseline pressure measurements; and determine leak severity of the leaking fluid inlet and outlet valves based on the difference. In such implementations, among others within the scope of the present disclosure, the processing device may determine that the leak severity of the leaking fluid inlet and outlet valves is low when the difference between the irregular pressure measurements and the baseline pressure measurements is less than a predetermined threshold quantity. The processing device may determine that the leak severity of the leaking fluid inlet and outlet valves is high when the difference between the irregular pressure measurements and the baseline pressure measurements is equal to or greater than a predetermined threshold quantity.

The pump may be or comprise a drilling mud pump.

The pump may comprise a plurality of chambers, each chamber may be associated with a fluid displacing member, each fluid displacing member may be operable to reciprocate with respect to the chamber to alternatingly cause the chamber to receive the fluid via the fluid inlet manifold and discharge the fluid via the fluid outlet manifold, a corresponding instance of the fluid inlet valves may permit the fluid to flow into and prevent the fluid from flowing out of each chamber, and a corresponding instance of the fluid outlet valves may permit the fluid to flow out of and prevent the fluid from flowing into each chamber.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus comprising: a system for monitoring operational health of a pump operable to pump a fluid at a wellsite, wherein the pump comprises a plurality of reciprocating fluid displacing members with each reciprocating fluid displacing member having a corresponding fluid inlet valve and a corresponding fluid outlet valve, and wherein the system comprises: a first pressure sensor disposed in association with the pump and operable to facilitate determination of first pressure measurements of the fluid at a fluid inlet manifold in fluid communication with the corresponding fluid inlet valve of each of the plurality of reciprocating fluid displacing members of the pump during pumping operations and/or a second pressure sensor disposed in association with the pump and operable to facilitate determination of second pressure measurements of the fluid at a fluid outlet manifold in fluid communication with the corresponding fluid outlet valve of each of the plurality of reciprocating fluid displacing members of the pump during pumping operations; a position sensor disposed in association with the pump and operable to facilitate determination of position measurements of the fluid displacing members of the pump during pumping operations; and a processing device comprising a processor and memory storing computer program code, wherein the processing device is communicatively connected with the first and/or the second pressure sensor and the position sensor, and wherein the processing device is operable to: receive the first and/or second pressure measurements and the position measurements; detect first irregular pressure measurements based on the received pressure measurements from the first pressure sensor and/or second irregular pressure measurements based on the received pressure measurements from the second pressure sensor; determine an operational phase of the pump based on the received position measurements; and determine at least one of the corresponding fluid inlet valves is leaking based on which of the corresponding fluid inlet valves is closed during the detected first irregular pressure measurements of the operational phase and/or determine at least one of the corresponding fluid outlet valves is leaking based on which of the corresponding fluid outlet valves is closed during the detected second irregular pressure measurements of the operational phase.

2. The apparatus of claim 1 wherein determining which of the corresponding fluid inlet valves and/or the corresponding fluid outlet valves of the pump is leaking further comprises determining which of the corresponding fluid inlet valves and/or the corresponding fluid outlet valves is closed during an entirety of the detected irregular pressure measurements.

3. The apparatus of claim 1 wherein determining which of the corresponding fluid inlet valves and/or the corresponding fluid outlet valves of the pump is leaking further comprises determining which of the corresponding fluid inlet valves and/or the corresponding fluid outlet valves closes at about the same time the detected first irregular pressure measurements and/or the second irregular pressure measurements start.

4. The apparatus of claim 1 wherein the irregular pressure measurements comprise pressure measurements that are: lower than baseline pressure measurements; or higher than the baseline pressure measurements.

5. The apparatus of claim 1 wherein the system further comprises a vibration sensor disposed in association with the pump and operable to facilitate determination of vibration measurements of impacts generated by the corresponding fluid inlet valves and/or the corresponding fluid outlet valves of the pump when closing, and wherein the processing device is further operable to: receive the vibration measurements; and determine operational phase of the pump further based on the vibration measurements, wherein the operational phase of the pump is defined by which of the corresponding fluid inlet valves and/or the corresponding fluid outlet valves of the pump is closed.

6. The apparatus of claim 1 wherein the pump is or comprises a drilling mud pump.

7. A method comprising: commencing operation of a processing device to monitor operational health of a pump for pumping a fluid at a wellsite, wherein the pump is a reciprocating pump comprising a plurality of reciprocating fluid displacing members with each reciprocating fluid displacing member having a corresponding fluid inlet valve and a corresponding fluid outlet valve, and wherein, during pumping operations of the pump, the processing device: receives first pressure measurements of the fluid at a fluid inlet manifold from a first pressure sensor in fluid communication with the corresponding fluid inlet valve of each of the plurality of reciprocating fluid displacing members of the pump and/or receives second pressure measurements of the fluid at a fluid outlet manifold from a second pressure sensor in fluid communication with the corresponding fluid outlet valve of each of the plurality of reciprocating fluid displacing members of the pump; receives position measurements of the reciprocating fluid displacing members of the pump; detects first irregular pressure measurements based on the received pressure measurements from the first pressure sensor and/or second irregular pressure measurements based on the received pressure measurements from the second pressure sensor; determines an operational phase of the pump based on the received position measurements; and determines at least one of the corresponding fluid inlet valves is leaking based on which of the corresponding fluid inlet valves is closed during the detected first irregular pressure measurements of the operational phase and/or determine at least one of the corresponding fluid outlet valves is leaking based on which of the corresponding fluid outlet valves is closed during the detected second irregular pressure measurements of the operational phase.

8. The method of claim 7 wherein determining which of the corresponding fluid inlet valves and/or the corresponding fluid outlet valves of the pump is leaking further comprises determining which of the fluid inlet and outlet valves is closed during an entirety of the detected irregular pressure measurements.

9. The method of claim 7 wherein determining which of the corresponding fluid inlet valves and/or the corresponding fluid outlet valves of the pump is leaking comprises determining which of the corresponding fluid inlet valves and/or the corresponding fluid outlet valves closes at about the same time the detected first irregular pressure measurements and/or the second irregular pressure measurements start.

10. The method of claim 7 wherein determining which of the corresponding fluid inlet valves and/or the corresponding fluid outlet valves is closed during the detected first irregular pressure measurements and/or the detected second irregular pressure measurements further comprises determining which of the corresponding fluid inlet valves and/or the corresponding fluid outlet valves: closes at about the same time the detected first irregular pressure measurements and/or the detected second irregular pressure measurements start; and opens at about the same time the detected first irregular pressure measurements and or the detected second irregular pressure measurements stop.

11. The method of claim 7 wherein the first irregular pressure measurements and or the second irregular pressure measurements comprise pressure measurements that are: lower than baseline pressure measurements; or higher than the baseline pressure measurements.

12. The method of claim 7 wherein the processing device further: receives vibration measurements of impacts generated by the corresponding fluid inlet valves and/or the corresponding fluid outlet valves of the pump when closing; and determines operational phase of the pump further based on the vibration measurements, wherein the operational phase of the pump is defined by which of the corresponding fluid inlet valves and/or the corresponding fluid outlet valves of the pump is closed.

13. A method comprising: commencing operation of a processing device to monitor operational health of a pump for pumping a fluid at a wellsite, wherein the pump is a reciprocating pump comprising a plurality of reciprocating fluid displacing members with each reciprocating fluid displacing member having a corresponding fluid inlet valve and a corresponding fluid outlet valve, and wherein, during pumping operations of the pump, the processing device: receives first pressure measurements of the fluid at a fluid inlet manifold from a first pressure sensor in fluid communication with the corresponding fluid inlet valve of each of the plurality of reciprocating fluid displacing members of the pump and/or receives second pressure measurements of the fluid at a fluid outlet manifold from a second pressure sensor in fluid communication with the corresponding fluid outlet valve of each of the plurality of reciprocating fluid displacing members of the pump; receives vibration measurements of impacts generated by the corresponding fluid inlet valves and/or the corresponding fluid outlet valves of the pump when closing; detects first irregular pressure measurements based on the received pressure measurements from the first pressure sensor and/or second irregular pressure measurements based on the received pressure measurements from the second pressure sensor; determines operational phase of the pump based on the received vibration measurements; and determines at least one of the corresponding fluid inlet valves is leaking based on which of the corresponding fluid inlet valves is closed during the detected first irregular pressure measurements of the operational phase and/or determine at least one of the corresponding fluid outlet valves is leaking based on which of the corresponding fluid outlet valves is closed during the detected second irregular pressure measurements of the operational phase.

14. The method of claim 13 wherein determining which of the fluid inlet and outlet valves of the pump is leaking comprises determining which of the corresponding fluid inlet valves and/or the corresponding fluid outlet valves closes at about the same time the detected first irregular pressure measurements and/or the second irregular pressure measurements start.

15. The method of claim 13 wherein determining which of the corresponding fluid inlet valves and/or the corresponding fluid outlet valves of the pump is leaking comprises determining which of the corresponding fluid inlet valves and/or the corresponding fluid valves: closes at about the same time the detected first irregular pressure measurements and/or the detected second irregular pressure measurements start; and opens at about the same time the detected first irregular pressure measurements and/or the detected second irregular pressure measurements stop.

16. The method of claim 13 wherein first irregular pressure measurements and or the second irregular pressure measurements comprise pressure measurements that are: lower than baseline pressure measurements; or higher than the baseline pressure measurements.

17. The method of claim 13 wherein the processing device further: receives position measurements of the plurality of reciprocating fluid displacing members of the pump from a position sensor; and determines the operational phase of the pump further based on the position measurements from the position sensor.

\* \* \* \* \*